US012670506B1

(12) United States Patent
Tichy

(10) Patent No.: US 12,670,506 B1
(45) Date of Patent: Jun. 30, 2026

(54) SYSTEM AND METHOD OF SCALING-AWARE RATING OF COUNT FORECASTS

(71) Applicant: Blue Yonder Group, Inc., Scottsdale, AZ (US)

(72) Inventor: Malte Christopher Tichy, Hamburg (DE)

(73) Assignee: Blue Yonder Group, Inc., Scottsdale, AZ (US)

( * ) Notice: Subject to any disclaimer, the term of this patent is extended or adjusted under 35 U.S.C. 154(b) by 294 days.

(21) Appl. No.: 18/214,224

(22) Filed: Jun. 26, 2023

Related U.S. Application Data

(60) Provisional application No. 63/427,202, filed on Nov. 22, 2022, provisional application No. 63/424,698, filed on Nov. 11, 2022, provisional application No. 63/415,417, filed on Oct. 12, 2022, provisional application No. 63/405,398, filed on Sep. 10, 2022.

(51) Int. Cl.
*G06Q 30/00* (2023.01)
*G06Q 30/0202* (2023.01)

(52) U.S. Cl.
CPC .............................. *G06Q 30/0202* (2013.01)

(58) Field of Classification Search
CPC .................................................. G06Q 30/0202
USPC .......................................................... 705/28
See application file for complete search history.

(56) References Cited

U.S. PATENT DOCUMENTS

| | | | | |
|---|---|---|---|---|
| 12,099,997 B1* | 9/2024 | Hoffberg | .............. | G06Q 20/065 |
| 2009/0276289 A1* | 11/2009 | Dickinson | ............ | G06Q 10/063 |
| | | | | 705/7.29 |
| 2010/0125486 A1* | 5/2010 | Sinclair | .............. | G06Q 30/0202 |
| | | | | 705/7.31 |
| 2023/0289721 A1* | 9/2023 | Ouellet | .............. | G06Q 30/0202 |

FOREIGN PATENT DOCUMENTS

| | | | | | |
|---|---|---|---|---|---|
| JP | 2020203075 A | * | 12/2020 | .............. | B60L 50/20 |
| JP | 2023500378 A | * | 1/2023 | ......... | G06Q 30/0631 |

OTHER PUBLICATIONS

Fotios Petropoulos et al., "Forecasting: theory and practice," International Journal of Forecasting vol. 38, Issue 3, Jul.-Sep. 2022, pp. 705-871.

* cited by examiner

*Primary Examiner* — Russell S Glass
(74) *Attorney, Agent, or Firm* — Spencer Fane LLP; Steven J. Laureanti

(57) ABSTRACT

A system and method are disclosed for evaluating a forecast. The method includes aggregating a set of predictions and a set of actuals into prediction buckets, rating prediction data of the set of predictions using forecast metrics, computing an ideal benchmark for the forecast metrics, determining a scaling adjustment to calculate one or more non-ideal benchmarks to create a forecast rating scale, determining a score for each of the prediction buckets, the score corresponding to the forecast rating scale; and aggregating the determined scores of the prediction buckets to generate an overall score. The method further includes generating a calibration diagram comprising observed frequency and predicted probability of the set of predictions and the set of actuals.

20 Claims, 31 Drawing Sheets

300

302 — BIN PREDICTION-ACTUAL PAIRS BY BUCKETS OF PREDICTIONS

304 — RATE PREDICTION VALUES USING FORECAST METRIC

306 — COMPUTE IDEAL BENCHMARK FOR THE FORECAST METRIC

308 — DETERMINE SCALING ADJUSTMENT FOR NON-IDEAL BENCHMARKS

310 — DETERMINE SCORE FOR EACH BUCKET

312 — AGGREGATE BUCKET SCORES

END

SYSTEM AND METHOD OF SCALING-AWARE RATING OF COUNT FORECASTS

CROSS-REFERENCE TO RELATED APPLICATIONS

The present disclosure is related to that disclosed in the U.S. Provisional Application No. 63/405,398, filed Sep. 10, 2022, entitled "Scaling and Distribution Aware Forecast Evaluation", U.S. Provisional Application No. 63/415,417, filed Oct. 12, 2022, entitled "Scaling and Distribution Aware Forecast Evaluation", U.S. Provisional Application No. 63/424,698, filed Nov. 11, 2022, entitled "Scaling and Distribution Aware Forecast Evaluation," and U.S. Provisional Application No. 63/427,202, filed Nov. 22, 2022, entitled "Scaling-Aware Rating of Count Forecasts". U.S. Provisional Application Nos. 63/405,398, 63/415,417, 63/424,698, and 63/427,202 are assigned to the assignee of the present application. The present invention hereby claims priority under 35 U.S.C. § 119 (e) to U.S. Provisional Application Nos. 63/405,398, 63/415,417, 63/424,698, and 63/427,202.

TECHNICAL FIELD

The present disclosure relates generally to supply chain planning and specifically to evaluating forecasts in supply chains.

BACKGROUND

Forecasts of expected outcomes are frequently used to plan subsequent actions. For example, a forecast of sales in a supply chain network may be used to plan the manufacture and distribution of products in the supply chain. In general, a more accurate forecast may be more confidently relied upon in planning. Existing evaluation metrics for forecasts, however, lack interpretability. For example, it may be unclear what a particular percentage error for a forecast means, or even whether such a result is "good" or "bad." Existing evaluation metrics lack information about the distribution under which one may expect the counts of a forecast to be distributed, and also lack information about the scaling properties of that distribution. For example, in a supply chain network, achieved metrics between slow selling products and fast selling products cannot be compared meaningfully. Existing evaluation metrics for forecasts are therefore difficult to interpret and cannot be relied on across different domains, both of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
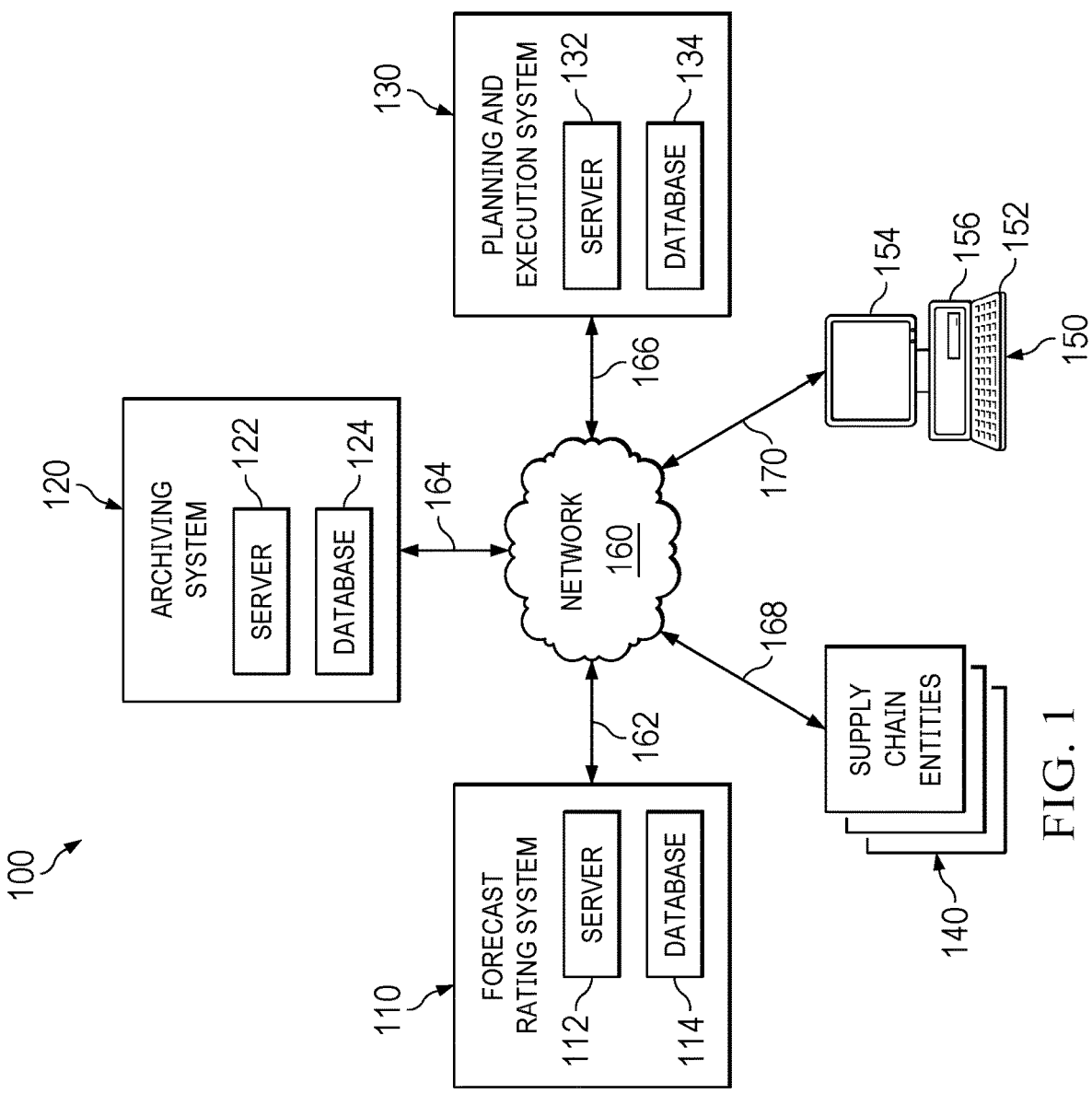
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a distribution-aware and scaling-aware forecast rating system and method that makes the dependence on the underlying process and the scaling of forecast metrics explicit. Embodiments provide a forecast evaluation that puts one or more forecast metrics into context to allow comparison between otherwise incomparable forecasting situations. Embodiments may provide a single number as a rating of a forecast that can be interpreted as a rating for the quality of the predictions. Embodiments may indicate areas of improvement in a forecast, such as which product group forecasts may be improved, while simultaneously indicating which areas of a forecast may already be nearing the best possible performance. The use of embodiments thus allows users to focus development efforts and debugging of predictive models where such time and effort will be most efficient. Further, the use of embodiments may enable users without statistical expertise to understand and act on forecast evaluations in planning and operations.

Embodiments of the following disclosure enable forecast rating systems to rate and judge forecasts in a comparable manner regardless of Poisson uncertainty or the scaling factor associated with forecast metrics. According to one aspect, granular forecasts in retail on product-location-day-level may utilize an evaluation that reflects the forecast's quality in the context of what is possible in principle. The low-count-rate-regime in retail (an intermittent demand of a few items might be predicted per product, day, and location) is dominated by inevitable Poisson uncertainty. This creates uncertainty when determining whether a certain achieved metric value is dominated by Poisson noise or is a bad prediction model. Further, every evaluation metric suffers from scaling, that is, the value is mostly defined by the predicted selling rate and the resulting rate-dependent Poisson noise itself, and only secondarily by the quality of the forecast. For any metric, comparing two groups of forecasted products almost always yields a determination that the slow movers are performing worse than the fast movers or vice versa, and thus leads to the naive scaling trap. By comparing the achieved value per bucket to benchmarks, a scaling-aware rating may be obtained. This rating avoids the naive scaling trap, provides an immediate intuitive rating of forecast quality, and allows a comparison of forecasts that concern different products or even industries.

FIG. 1 illustrates supply chain network 100, in accordance with a first embodiment. Supply chain network 100 comprises forecast rating system 110, archiving system 120, planning and execution system 130, one or more supply chain entities 140, one or more computers 150, network 160, and one or more communication links 162-170. Although a single forecast rating system 110, a single archiving system 120, a single planning and execution system 130, one or more supply chain entities 140, one or more computers 150, a single network 160, and one or more communication links 162-170 are shown and described, embodiments contemplate any number of forecast rating systems, archiving systems, planning and execution systems, supply chain entities, computers, networks, or communication links, according to particular needs.

In one embodiment, forecast rating system 110 comprises server 112 and database 114. As described in more detail below, forecast rating system 110 may, in an embodiment, utilize one or more software modules of server 112 to evaluate the quality of demand forecasts 284 (FIG. 2) in a distribution-aware and scaling-aware manner. Demand forecasts 284 may be generated by planning and execution system 130 to prepare one or more supply chain plans for supply chain network 100. Distribution-aware and scaling-aware evaluation of demand forecasts 284 may allow planning and execution system 130 to produce higher quality supply chain plans.

Archiving system 120 comprises server 122 and database 124. Although archiving system 120 is shown as comprising a single server 122 and a single database 124, embodiments contemplate any suitable number of servers or databases internal to or externally coupled with archiving system 120. Server 122 of archiving system 120 may support one or more processes for receiving and storing data from planning and execution system 130, one or more supply chain entities 140, and/or one or more computers 150 of supply chain network 100. According to some embodiments, archiving system 120 comprises an archive of data received from planning and execution system 130, one or more supply chain entities 140, and/or one or more computers 150 of supply chain network 100. Archiving system 120 provides archived data to forecast rating system 110 and/or planning and execution system 130. Server 122 may store the received data in database 124. Database 124 of archiving system 120 may comprise one or more databases or other data storage arrangements at one or more locations, local to, or remote from, server 122.

According to an embodiment, planning and execution system 130 comprises server 132 and database 134. Supply chain planning and execution is typically performed by several distinct and dissimilar processes, including, for example, assortment planning, demand planning, operations planning, production planning, supply planning, distribution planning, execution, pricing, forecasting, transportation management, warehouse management, inventory management, fulfillment, procurement, and the like. Server 132 of planning and execution system 130 comprises one or more modules, such as, for example, a forecasting module, planning module 260, a solver, a modeler, and/or an engine, for performing actions of one or more planning and execution processes. Server 132 stores and retrieves data from database 134 or one or more locations in supply chain network 100. In addition, planning and execution system 130 operates on one or more computers 150 that are integral to or separate from the hardware and/or software that support archiving system 120 and forecast rating system 110.

One or more supply chain entities 140 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Although one example of supply chain network 100 is illustrated and described, embodiments contemplate any configuration of supply chain network 100, without departing from the scope described herein.

As shown in FIG. 1, supply chain network 100 comprising forecast rating system 110, archiving system 120, planning and execution system 130, and one or more supply chain entities 140 may operate on one or more computers 150 that are integral to or separate from the hardware and/or software that support the forecast rating system 110, archiving system 120, planning and execution system 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer-readable medium, magnetic computer disks, flash drives, CD-ROM, in-memory device, or other suitable media to receive output from and provide input to supply chain network 100.

One or more computers 150 may include one or more processors 156 and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field-programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from forecast rating system 110, archiving system 120, planning and execution system 130, and one or more supply chain entities 140. In addition, each of one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with forecast rating system 110 and archiving system 120.

In one embodiment, forecast rating system 110 may be coupled with network 160 using communication link 162, which may be any wireline, wireless, or other link suitable to support data communications between forecast rating system 110 and network 160 during operation of supply chain network 100. Archiving system 120 may be coupled with network 160 using communication link 164, which may be any wireline, wireless, or other link suitable to support data communications between archiving system 120 and network 160 during operation of supply chain network 100. Planning and execution system 130 may be coupled with network 160 using communication link 166, which may be any wireline, wireless, or other link suitable to support data communications between planning and execution system 130 and network 160 during operation of supply chain network 100. One or more supply chain entities 140 may be coupled with network 160 using communication link 168, which may be any wireline, wireless, or other link suitable to support data communications between one or more supply chain entities 140 and network 160 during operation of supply chain network 100. One or more computers 150 may be coupled with network 160 using communication link 170, which may be any wireline, wireless, or other link suitable to support data communications between one or more computers 150 and network 160 during operation of supply chain network 100. Although communication links 162-170 are shown as generally coupling forecast rating system 110, archiving system 120, planning and execution system 130, one or more supply chain entities 140, and one or more computers 150 to network 160, any of forecast rating system 110, archiving system 120, planning and execution system 130, one or more supply chain entities 140, and one or more computers 150 may communicate directly with each other, according to particular needs.

In another embodiment, network 160 includes the Internet and any appropriate local area networks (LANs), metropolitan area networks (MANs), or wide area networks (WANs) coupling forecast rating system 110, archiving system 120, planning and execution system 130, one or more supply chain entities 140, and one or more computers 150. For example, data may be maintained locally to, or externally of, forecast rating system 110, archiving system 120, planning and execution system 130, one or more supply chain entities 140, and one or more computers 150 and made available to one or more associated users of forecast rating system 110, archiving system 120, planning and execution system 130, one or more supply chain entities 140, and one or more computers 150 using network 160 or in any other appropriate manner. For example, data may be maintained in a cloud database at one or more locations external to forecast rating system 110, archiving system 120, planning and execution system 130, one or more supply chain entities 140, and one or more computers 150 and made available to one or more associated users of forecast rating system 110, archiving system 120, planning and execution system 130, one or more supply chain entities 140, and one or more computers 150 using the cloud or in any other appropriate manner. Those skilled in the art will recognize that the complete structure and operation of the network and other components within supply chain network 100 are not depicted or described. Embodiments may be employed in conjunction with known communications networks and other components.

Figure 2:
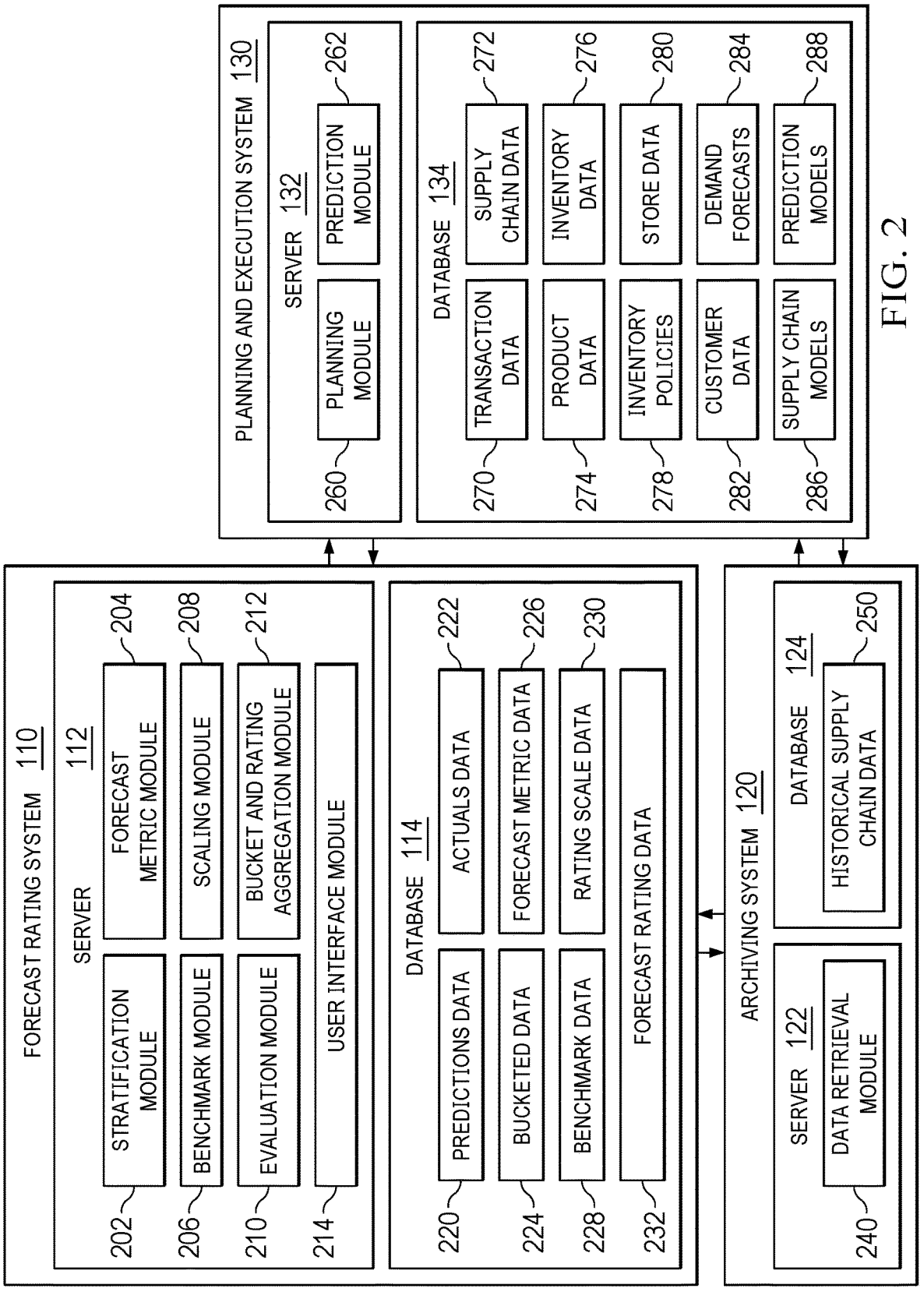
FIG. 2 illustrates the forecast rating system, the archiving system, and the planning and execution system of FIG. 1 in greater detail, in accordance with an embodiment.

FIG. 2 illustrates forecast rating system 110, archiving system 120, and planning and execution system 130 of FIG. 1 in greater detail, in accordance with an embodiment. Forecast rating system 110 may comprise server 112 and database 114, as described above. Although forecast rating system 110 is shown as comprising a single server 112 and a single database 114, embodiments contemplate any suitable number of servers or databases internal to or externally coupled with forecast rating system 110.

Server 112 of forecast rating system 110 comprises stratification module 202, forecast metric module 204, benchmark module 206, scaling module 208, evaluation module 210, bucket and rating aggregation module 212, and user interface module 214. Although server 112 is shown and described as comprising a single stratification module 202, a single forecast metric module 204, a single benchmark module 206, a single scaling module 208, a single evaluation module 210, a single bucket and rating aggregation module 212, and a single user interface module, embodiments contemplate any suitable number or combination of these located at one or more locations, local to, or remote from forecast rating system 110, such as on multiple servers or computers 150 at one or more locations in supply chain network 100.

Database 114 of forecast rating system 110 may comprise one or more databases or other data storage arrangements at one or more locations, local to, or remote from, server 112. Database 114 of forecast rating system 110 comprises, for example, predictions data 220, actuals data 222, bucketed data 224, forecast metric data 226, benchmark data 228, rating scale data 230, and forecast rating data 232. Although database 114 of forecast rating system 110 is shown and described as comprising predictions data 220, actuals data 222, bucketed data 224, forecast metric data 226, benchmark data 228, rating scale data 230, and forecast rating data 232, embodiments contemplate any suitable number or combination of data, located at one or more locations, local to, or remote from, forecast rating system 110, according to particular needs.

Stratification module 202 correlates predictions values and actuals values, such as predictions data 220 and actuals data 222 of database 114. For example, in supply chain network 100, predictions data 220 may be one or more demand forecasts for one or more items of the supply chain over a particular time period, while actuals data 222 may be the actual level of sales for the one or more products over the time period. Stratification module 202 groups the correlated data by prediction size into a set of buckets and saves the set of buckets as bucketed data 224. By bucketing the data according to prediction size rather than actual size, that is, by grouping the predictions by the expected size of the actual value, stratification module 202 may separate high volume and low volume products, which may avoid hindsight bias. Hindsight bias occurs when grouped by actuals, as an overprediction of zero-sales events may occur, since a prediction can never be negative.

Forecast metric module 204 rates the quality of predictions data 220, per bucket, using one or more forecast metrics. According to embodiments, forecast metrics comprise one or more functions that produce a numerical rating that compares predictions with actuals. Forecast metrics may include, but are not limited to, bias, mean ranked probability score (MRPS), relative mean ranked probability score (RMRPS), cumulative distribution function (CDF) accuracy, mean absolute percentage error (MAPE), mean absolute error (MAE), relative mean absolute error (RMAE), mean square error (MSE), or any other metric that may be used in the evaluation of a predictive model. Forecast metric module 204 saves the ratings corresponding to the forecast metrics as forecast metric data 226.

Figure 11A:
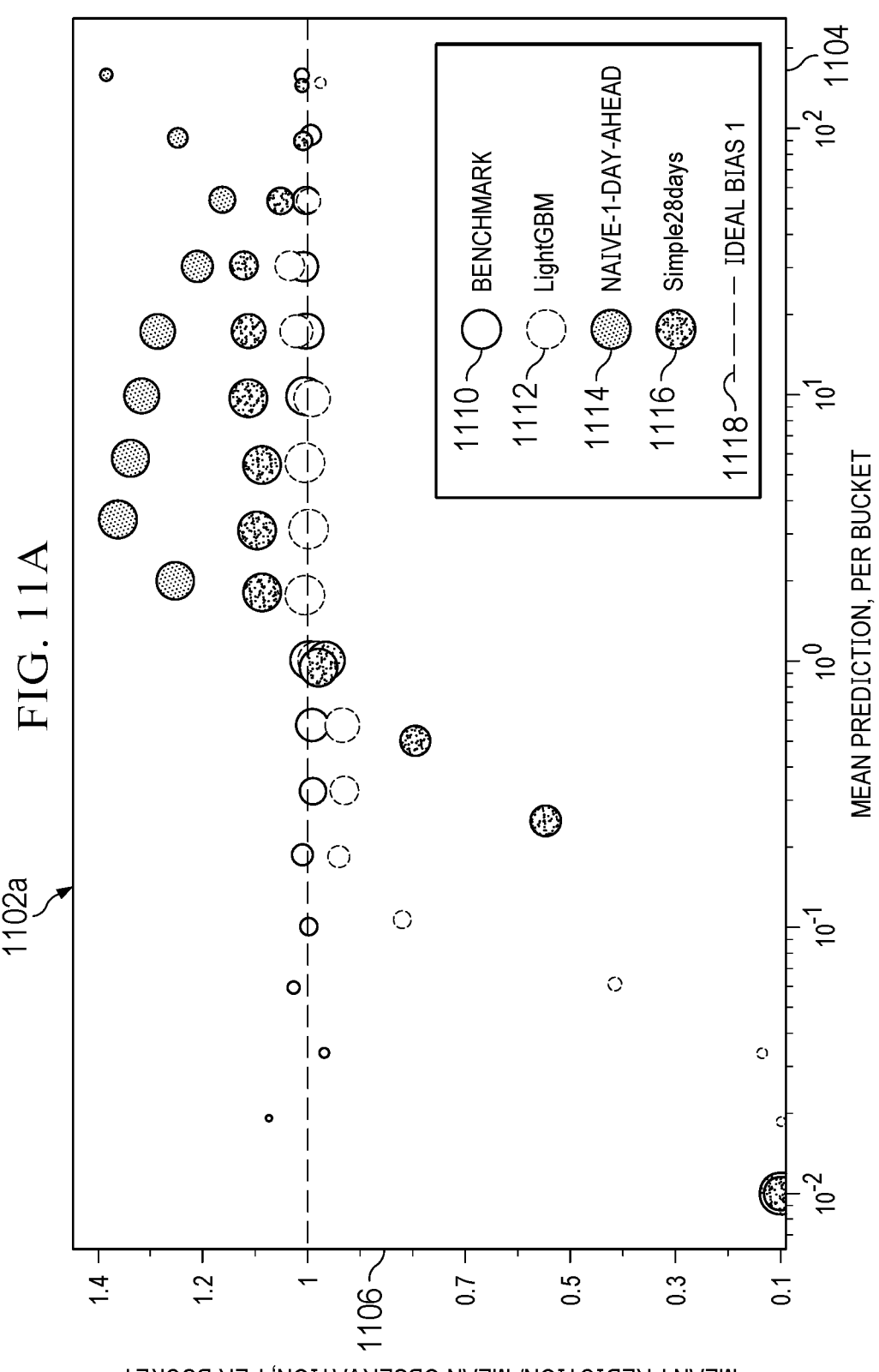
FIGS. 11A-11B illustrate benchmark charts for three prediction models and a benchmark model, in accordance with an embodiment.

According to an embodiment, benchmark module 206 determines, for the forecast metric used by forecast metric module 204 to rate the quality of the bucketed predictions, an optimal result (which may be referred to as a "best case" or "ideal case") for the forecast metric when used with predictions of the size of a particular bucket, for each bucket of the set of buckets. In some cases, the best case for a particular metric may be the value that is achieved when the actual is distributed according to the Poisson distribution, or any other distribution that the user knows to govern the behavior of actuals. For example, for the bias metric, a perfect bias score is one for prediction size of any value and is a horizontal line when plotted on a chart, such as, for example, benchmark chart 1102*a* (FIG. 11A). For other metrics, however, this behavior may be more intricate. Benchmark module 206 also determines non-ideal benchmarks using rating scale data 230 determined by scaling module 208. In embodiments, benchmark module 206 may generate calibration diagrams corresponding to the ideal benchmark, benchmark charts, and the like, which may be displayed by user interface module 214. Benchmark module 206 saves the determined best case and non-ideal benchmarks as benchmark data 228.

Scaling module 208 determines, for the forecast metric used by forecast metric module 204 to rate the quality of the bucketed predictions, a scale for non-ideal benchmarks. According to embodiments, scaling module 208 determines a scaling adjustment to calculate non-ideal benchmarks. Scaling module 208 may simulate non-Poissonian dispersions, such as, for example, a linear overdispersion (negative-binomial-one-process), a quadradic overdispersion (negative-binomial-two-process with constant relative systematic uncertainty), and the like, to determine the scaling adjustment. Scaling module 208 establishes upper and lower bounds for one or more forecast metric rating scales based, at least in part, on an ideal benchmark determined by benchmark module 206 and the determined scaling adjustment. Scaling module 208 may further divide the interval between the ideal benchmark and the worst benchmark into one or more ranges corresponding to one or more intermediate benchmark lines. Scaling module 208 saves the generated benchmarks as rating scale data 230.

Evaluation module 210 uses rating scale data 230 to evaluate the forecast metrics. In some embodiments, evaluation module 210 may subdivide the forecast metric rating scale such that the best case for the forecast metric is scored as 100, the worst case for the forecast metric is scored as 0, and the one or more intermediate benchmark lines are scored as values between 0 and 100, to provide a relative scale from worst performance to best performance with one or more descriptive ranges in between. In embodiments, evaluation module 210 may apply text descriptors to ranges of this forecast rating scale, such as, for example, "Perfect" for scores at or near 100, "Excellent" for a range of scores below "Perfect," "Good" for a range of scores below "Excellent," and so on. Evaluation module 210 may determine a score for each bucket according to the forecast metric rating scale, either on the forecast rating scale or using the text descriptors of the one or more ranges. Evaluation module 210 saves the scores as forecast rating data 232.

According to embodiments, bucket and rating aggregation module 212 of forecast rating system 110 aggregates the bucket rating of each bucket to give an overall rating of the forecast. In addition, or as an alternative, bucket and rating aggregation module 212 may compute reference values to determine an overall aggregated metric and rate the overall metric. Bucket and rating aggregation module 212 saves the generated ratings as forecast rating data 232.

User interface module 214 of forecast rating system 110 generates and displays a user interface (UI), such as, for example, a graphical user interface (GUI), that displays one or more interactive visualizations of forecasts and one or more evaluations or ratings of the forecasts. According to embodiments, user interface module 214 displays a GUI comprising interactive graphical elements for selecting one or more data, items, stores, customers, and the like, and, in response to the selection, displays one or more calibration diagrams, probability charts, reliability ratings, benchmark charts, and/or forecast rating charts.

Predictions data 220 comprises a set of predictions produced by a predictive model concerning a likely count for a future event, such as the number of sales of a product in a supply chain over a particular time period. In embodiments, predictions data 220 may be generated by prediction module 262 of server 132 of planning and execution system 130. In other embodiments, predictions data 220 may be retrieved from demand forecasts 284 of database 134 of planning and execution system 130. In still other embodiments, predictions data 220 may be produced by other predictive models in supply chain network 100 or obtained from other databases in supply chain network 100.

Actuals data 222 comprises a set of actual results corresponding to the events predicted in predictions data 220. According to embodiments, actuals data 222 comprises the actual recorded number of sales of a product in a supply chain over a particular time period. In some embodiments, actuals data 222 may be obtained from historical supply chain data 250 of database 124 of archiving system 120. In other embodiments, actuals data 222 may be obtained from other databases in supply chain network 100.

Bucketed data 224 comprises predictions data 220 correlated with actuals data 222 and aggregated by stratification module 202 into buckets of predicted values. For example, one bucket may include predictions for products predicted to sell within a range of units over a particular time period. In some cases, logarithmically spaced buckets (e.g., around 0.1, 1, 10, 100, etc.) may be used. When the size of buckets is too wide, the scaling within the bucket is too strong, which may lead to inaccurate forecast ratings. Similarly, buckets that have very different number of predictions (such as, for example, one bucket containing 90% or more of all predictions) may also lead to inaccurate forecast ratings.

Forecast metric data 226 comprises data used by forecast metric module 204 to rate the quality or, in some cases, accuracy of predictions data 220 relative to actuals data 222. For example, when the forecast metric used is MAPE, then a MAPE score for each bucket is saved as forecast metric data 226.

Benchmark data 228 comprises data generated by benchmark module 206 as an optimal result and one or more non-ideal results for the forecast metric within each bucket. Continuing the example above, when a MAPE score exists for every bucket, then benchmark data 228 may include a best possible MAPE score, according to the MAPE value achieved under the Poisson distribution, for the mean prediction within the bucket, as well as a MAPE value corresponding to a worst possible or very poor MAPE score and one or more intermediate MAPE values corresponding to intermediate benchmarks.

Rating scale data 230 is a scale used to rate the quality of a forecast metric for the size of predictions within a bucket. For example, when the forecast metric used is RMRPS, the usual scale of RMRPS may be from zero to two (or even higher). For fast movers, that is, buckets with a high prediction size value, a number close to zero may be considered perfect, and 0.5 may be considered mediocre to bad. However, for slow movers, that is, buckets with a low prediction size value, a number closer to one may be considered perfect. Thus, rating scale data 230 may be used to compare the relative quality of RMRPS values (or scores from other forecast metrics), even across items for which the best and worst possible outcomes vary greatly.

Forecast rating data 232 comprises a scaling-aware evaluation of prediction quality. According to some embodiments, forecast rating data 232 may be relative to a particular bucket, that is, a score on a numerical scale of zero to one hundred for predictions within a bucket of particular size. According to other embodiments, forecast rating data 232 may be a general rating for all predictions across all buckets.

As discussed above, archiving system 120 comprises server 122 and database 124. Although archiving system 120 is shown as comprising a single server 122 and a single database 124, embodiments contemplate any suitable number of servers or databases internal to or externally coupled with archiving system 120.

Server 122 of archiving system 120 comprises data retrieval module 240. Although server 122 is shown and described as comprising a single data retrieval module 240, embodiments contemplate any suitable number or combination of data retrieval modules located at one or more locations, local to, or remote from archiving system 120, such as on multiple servers or computers 150 at one or more locations in supply chain network 100.

In one embodiment, data retrieval module 240 of archiving system 120 receives historical supply chain data 250 from supply chain planning and execution system 130 and one or more supply chain entities 140, and stores received historical supply chain data 250 in archiving system 120 database 124. According to one embodiment, data retrieval module 240 of archiving system 120 may prepare historical supply chain data 250 for use as the training data of forecast rating system 110 by checking historical supply chain data 250 for errors and transforming historical supply chain data 250 to normalize, aggregate, and/or rescale historical supply chain data 250 to allow direct comparison of data received from different planning and execution systems 130, one or more supply chain entities 140, and/or one or more other locations local to, or remote from, archiving system 120. According to embodiments, data retrieval module 240 receives data from one or more sources external to supply chain network 100, such as, for example, weather data, special events data, social media data, calendar data, and the like and stores the received data as historical supply chain data 250.

Database 124 of archiving system 120 may comprise one or more databases or other data storage arrangements at one or more locations, local to, or remote from, server 122. Database 124 of archiving system 120 comprises, for example, historical supply chain data 250. Although database 124 of archiving system 120 is shown and described as comprising historical supply chain data 250, embodiments contemplate any suitable number or combination of data, located at one or more locations, local to, or remote from, archiving system 120, according to particular needs.

Historical supply chain data 250 comprises historical data received from forecast rating system 110, archiving system 120, planning and execution system 130, one or more supply chain entities 140, and/or one or more computers 150. Historical supply chain data 250 may comprise, for example, weather data, special events data, social media data, calendar data, and the like. In an embodiment, historical supply chain data 250 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As discussed above, planning and execution system 130 comprises server 132 and database 134. Although planning and execution system 130 is shown as comprising a single server 132 and a single database 134, embodiments contemplate any suitable number of servers or databases internal to or externally coupled with planning and execution system 130.

Server 132 of planning and execution system 130 comprises planning module 260 and prediction module 262. Although server 132 is shown and described as comprising a single planning module 260 and a single prediction module 262, embodiments contemplate any suitable number or combination of planning modules and prediction modules located at one or more locations, local to, or remote from planning and execution system 130, such as on multiple servers or computers 150 at one or more locations in supply chain network 100.

Database 134 of planning and execution system 130 may comprise one or more databases or other data storage arrangements at one or more locations, local to, or remote from, server 132. Database 134 of planning and execution system 130 comprises, for example, transaction data 270, supply chain data 272, product data 274, inventory data 276, inventory policies 278, store data 280, customer data 282, demand forecasts 284, supply chain models 286, and prediction models 288. Although database 134 of planning and execution system 130 is shown and described as comprising transaction data 270, supply chain data 272, product data 274, inventory data 276, inventory policies 278, store data 280, customer data 282, demand forecasts 284, supply chain models 286, and prediction models 288, embodiments contemplate any suitable number or combination of data, located at one or more locations, local to, or remote from, planning and execution system 130, according to particular needs.

Planning module 260 of planning and execution system 130 works in connection with prediction module 262 to generate a plan based on one or more predicted retail volumes, classifications, or other predictions. By way of example and not of limitation, planning module 260 may comprise a demand planner that generates demand forecasts 284 for one or more supply chain entities 140. Planning module 260 may generate demand forecasts 284, at least in part, from predictions and calculated factor values for one or more causal factors received from prediction module 262. By way of a further example, planning module 260 may comprise an assortment planner and/or a segmentation planner that generates product assortments that match causal effects calculated for one or more customers or products by prediction module 262, which may provide for increased customer satisfaction and sales, as well as reducing costs for shipping and stocking products at stores where they are unlikely to sell.

Prediction module 262 of planning and execution system 130 applies samples of transaction data 270, supply chain data 272, product data 274, inventory data 276, store data 280, customer data 282, demand forecasts 284 and other data to prediction models 288 to generate predictions and calculated factor values for one or more causal factors. As disclosed above, prediction module 262 of planning and execution system 130 predicts a volume Y (target) from a set of causal factors X along with causal factors strengths that describe the strength of each causal factor variable contributing to the predicted volume. According to some embodiments, prediction module 262 generates predictions at daily intervals. However, embodiments contemplate longer and shorter prediction phases that may be performed, for example, weekly, twice a week, twice a day, hourly, or the like.

Transaction data 270 of planning and execution system 130 database 134 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 270 is represented by any suitable combination of values and dimensions, aggregated or un-aggregated, such as, for example, sales per week, sales per week per location, sales per day, sales per day per season, or the like.

Supply chain data 272 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 274 of database 134 may comprise products identified by, for example, a product identifier (such as a Stock Keeping Unit (SKU), Universal Product Code (UPC) or the like), and one or more attributes and attribute types associated with the product ID. Product data 274 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 276 of database 134 may comprise any data relating to current or projected inventory quantities or states, order rules, or the like. For example, inventory data 276 may comprise the current level of inventory for each item at one or more stocking points across supply chain network 100. In addition, inventory data 276 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 276 in database 134, which may be used by planning and execution system 130 to place orders, set inventory levels at one or more stocking points, initiate manufacturing of one or more components, or the like in response to, and based at least in part on, a forecasted demand of planning and execution system 130.

Inventory policies 278 of database 134 may comprise any suitable inventory policy describing the reorder point and target quantity, or other inventory policy parameters that set rules for forecast rating system 110 and/or planning and execution system 130 to manage and reorder inventory. Inventory policies 278 may be based on target service level, demand, cost, fill rate, or the like. According to embodiments, inventory policies 278 comprise target service levels that ensure that a service level of one or more supply chain entities 140 is met with a set probability. For example, one or more supply chain entities 140 may set a service level at 95%, meaning one or more supply chain entities 140 sets the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, forecast rating system 110 and/or planning and execution system 130 may determine a replenishment order according to one or more replenishment rules, which, among other things, indicates to one or more supply chain entities 140 to determine or receive inventory to replace the depleted inventory. By way of example only and not by way of limitation, an inventory policy for non-perishable goods with linear holding and shorting costs comprises a min./max. (s,S) inventory policy. Other inventory policies 278 may be used for perishable goods, such as fruit, vegetables, dairy, fresh meat, as well as electronics, fashion, and similar items for which demand drops significantly after a next generation of electronic devices or a new season of fashion is released.

Store data 280 may comprise data describing the stores of one or more retailers and related store information. Store data 280 may comprise, for example, a store ID, store description, store location details, store location climate, store type, store opening date, lifestyle, store area (expressed in, for example, square feet, square meters, or other suitable measurement), latitude, longitude, and other similar data.

Customer data 282 may comprise customer identity information, including, for example, customer relationship management data, loyalty programs, and mappings between product purchases and one or more customers so that a customer associated with a transaction may be identified. Customer data 282 may comprise data relating customer purchases to one or more products, geographical regions, store locations, or other types of dimensions.

Demand forecasts 284 of database 134 may indicate future expected demand based on, for example, any data relating to past sales, past demand, purchase data, promotions, events, or the like of one or more supply chain entities 140. Demand forecasts 284 may cover a time interval such as, for example, by the minute, hour, daily, weekly, monthly, quarterly, yearly, or any other suitable time interval, including substantially in real time. Demand may be modeled as a Poisson or negative binomial distribution. According to other embodiments, the model also takes into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Gamma-Poisson model, the exact values of the parameters of the model may be specific to a single product to be sold on a specific day in a specific location or sales channel and may depend on a wide range of frequently changing influencing causal factors.

Supply chain models 286 of database 134 comprise characteristics of a supply chain setup to deliver the customer expectations of a particular customer business model. These characteristics may comprise differentiating factors, such as, for example, MTO (Make-to-Order), ETO (Engineer-to-Order), or MTS (Make-to-Stock). However, supply chain models 286 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model. Prediction models 288 comprise one or more of the trained models used by planning and execution system 130 for predicting, among other variables, pricing, targeting, or retail volume, such as, for example, a forecasted demand volume for one or more products at one or more stores of one or more retailers based on the prices of the one or more products.

Figure 3:
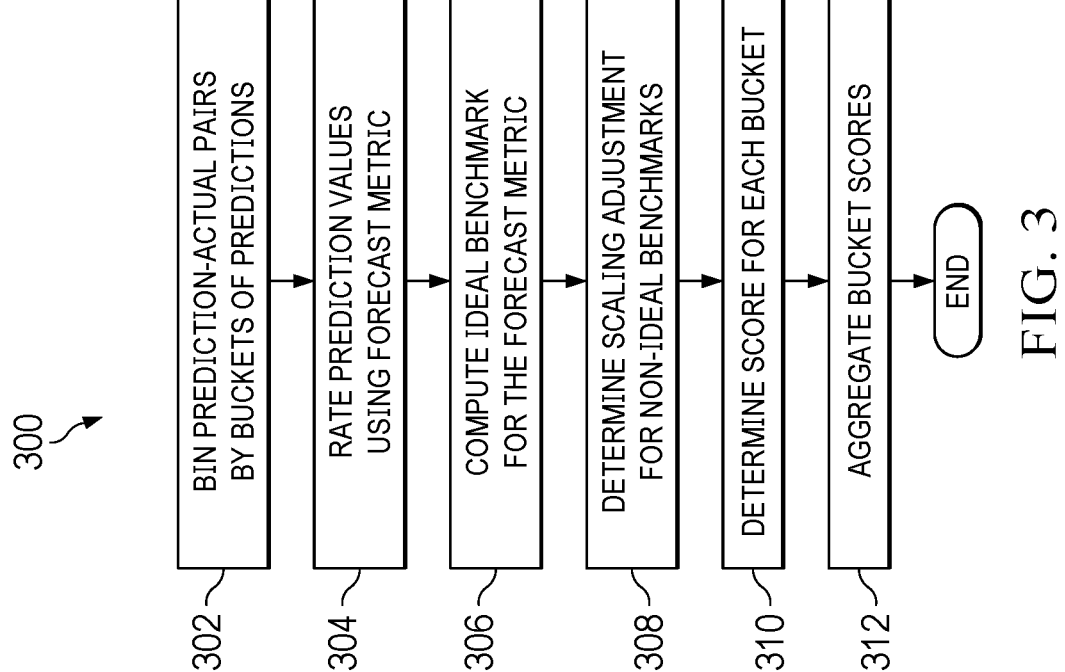
FIG. 3 illustrates a method for evaluating a forecast in a scaling-aware manner, in accordance with an embodiment.
Figure 4A:
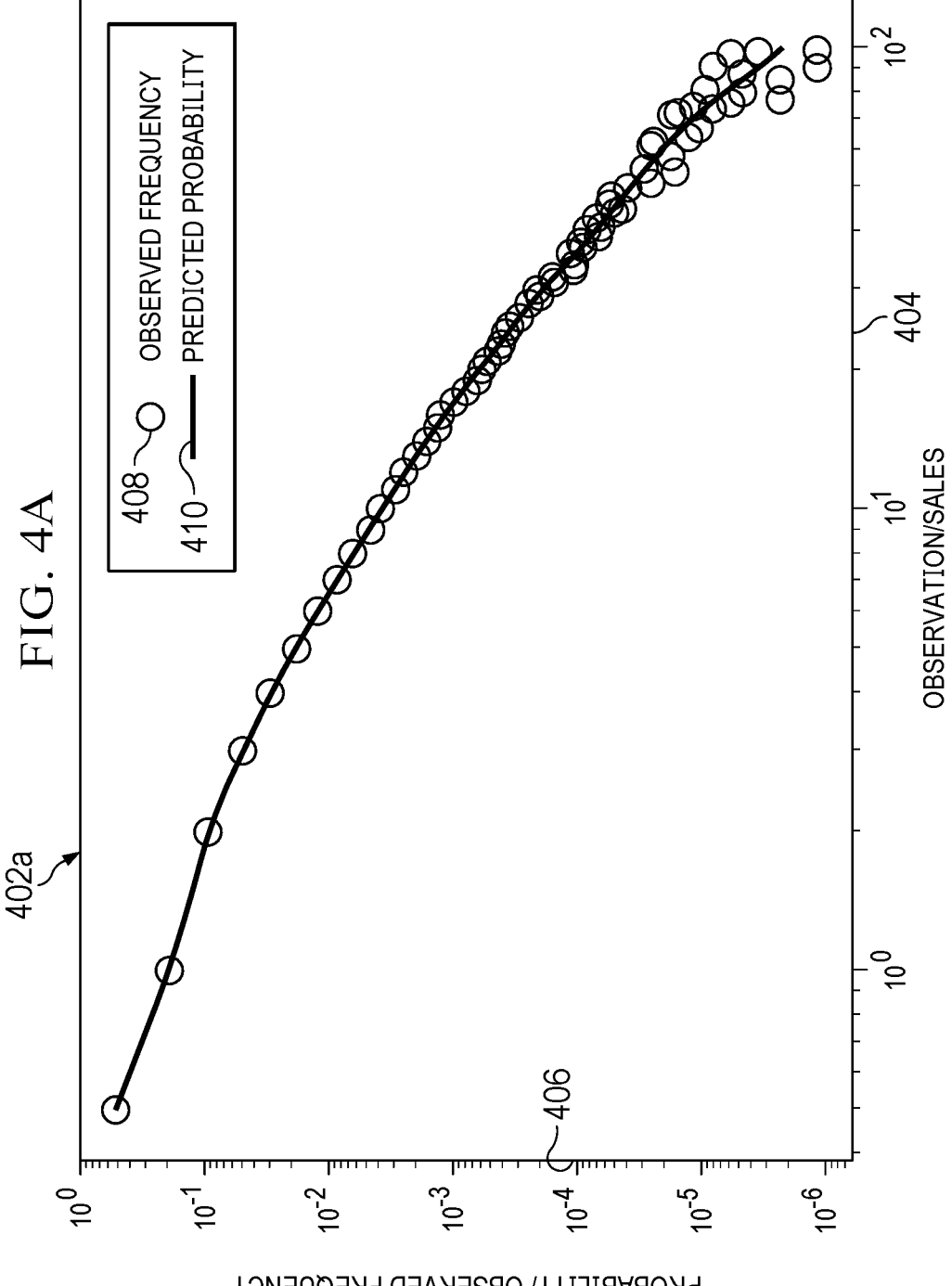
FIGS. 4A-4D illustrate calibration diagrams for an ideal benchmark model, in accordance with an embodiment.
Figure 4B:
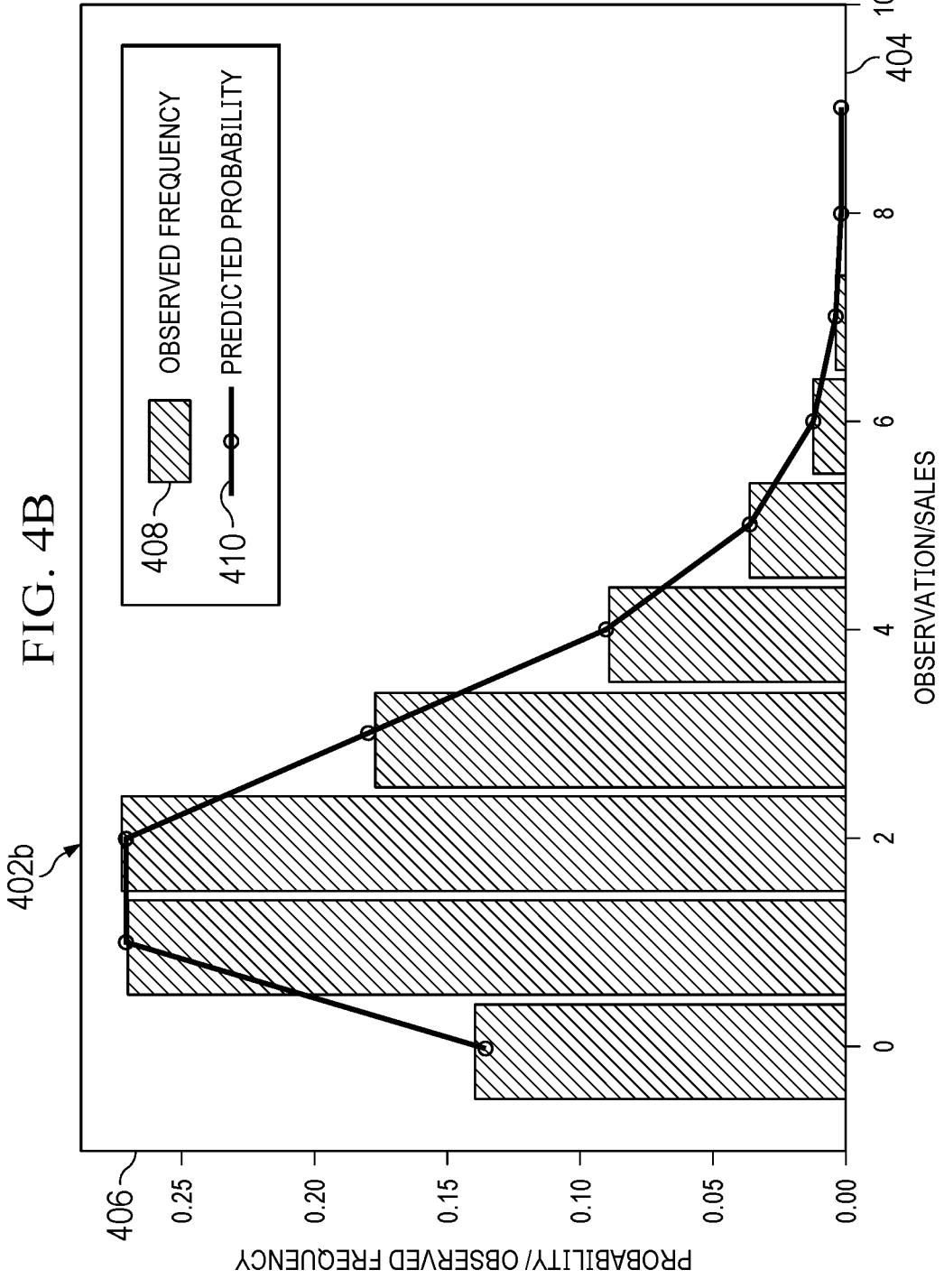
Figure 4C:
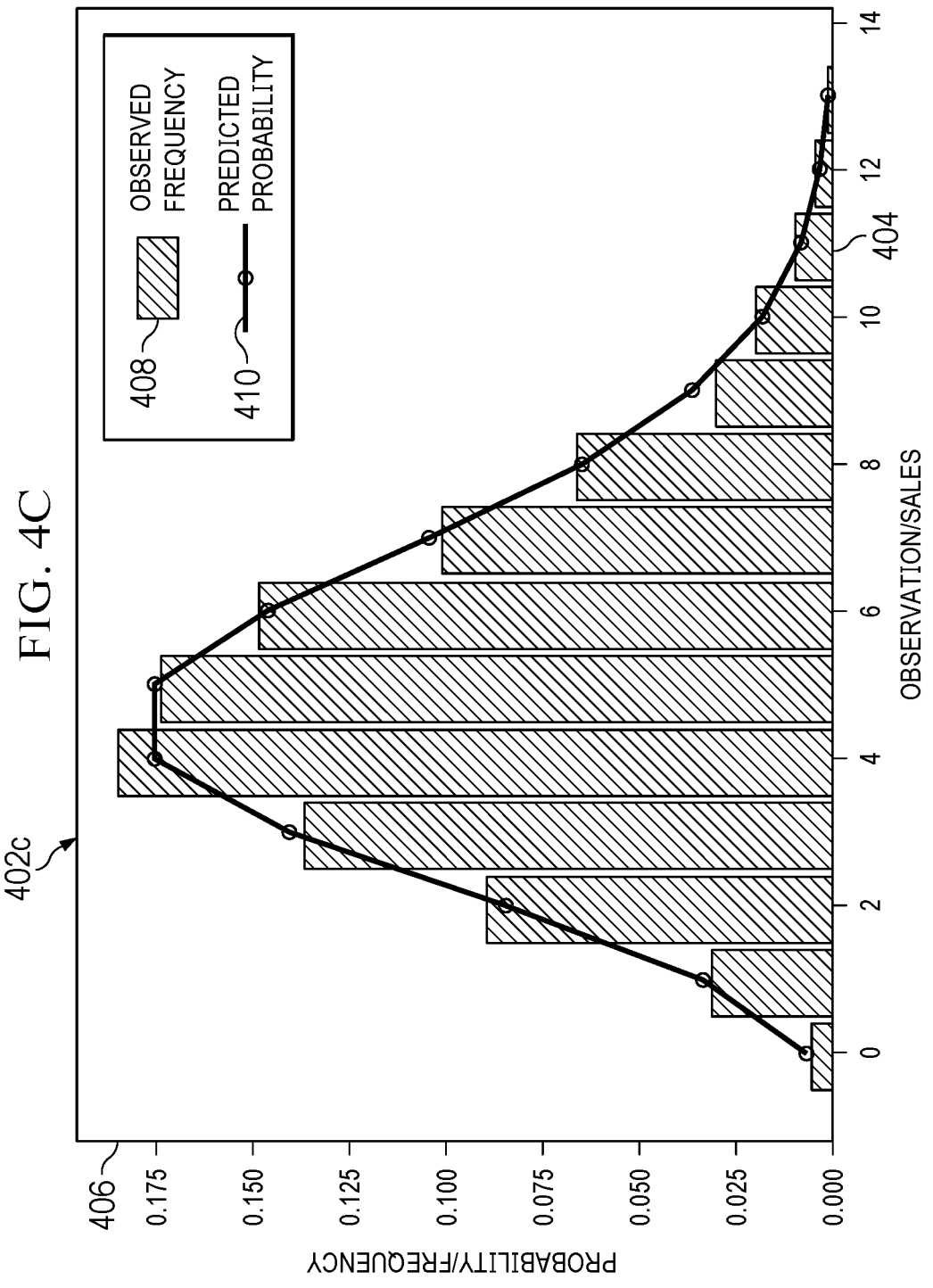
Figure 4D:
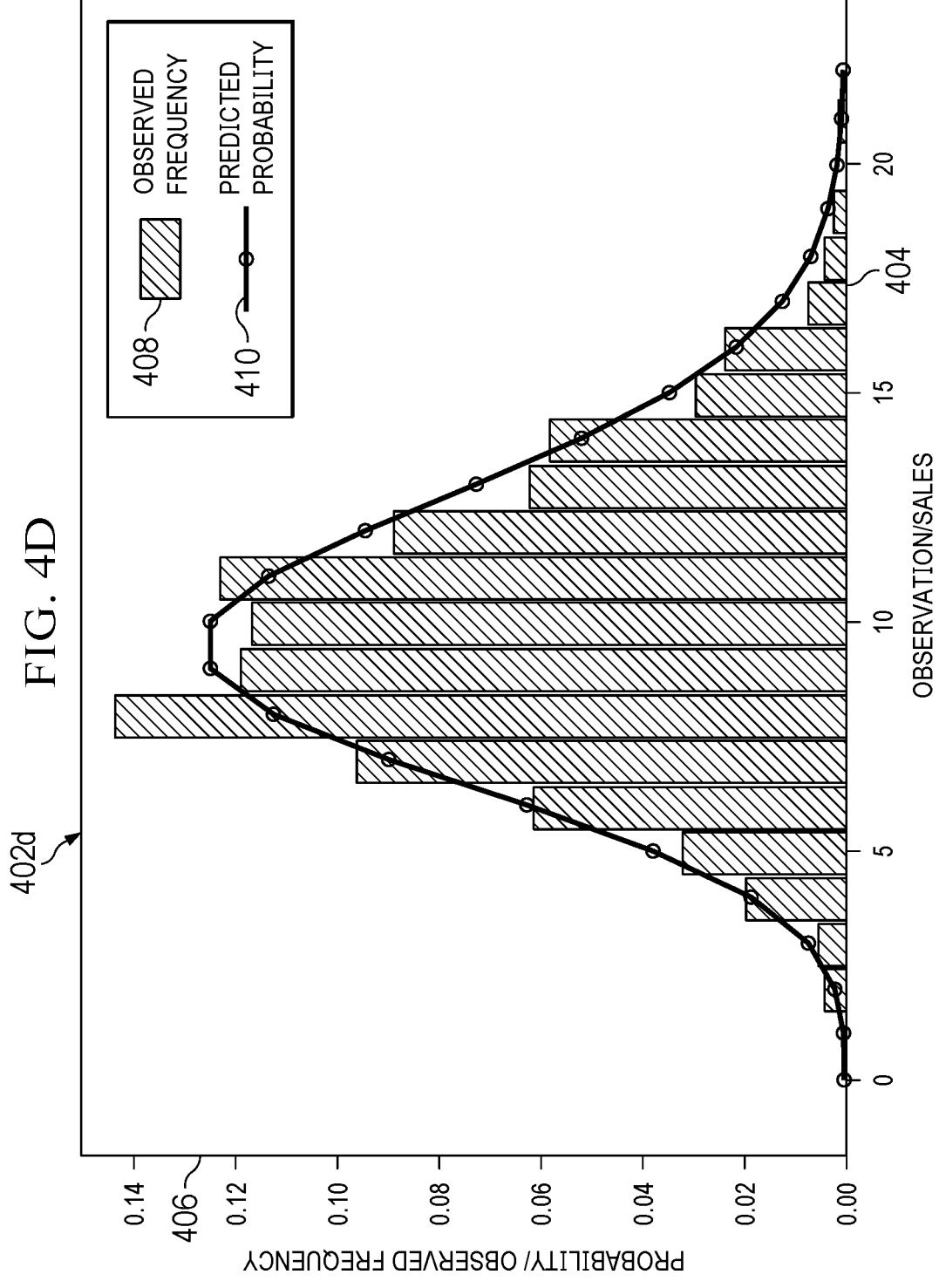

FIG. 3 illustrates method 300 for evaluating a forecast in a scaling-aware manner, in accordance with an embodiment. Method 300 proceeds by one or more activities, which although described in a particular order may be performed in one or more permutations, combinations, orders, or repetitions according to particular needs.

At activity 302, stratification module 202 groups a set of predictions and a set of actuals into prediction buckets. The set of predictions may be for the sales numbers of items, or demand, and the set of actuals may be corresponding actual sales values. In some embodiments, stratification module 202 may use logarithmically spaced buckets, that is, a bucket around predictions of one, a bucket around predictions of ten, of one hundred, of 0.1, etc., and with a certain number of buckets between powers of ten, as calculated by Equation 1:

$$R_j = \frac{\text{round}\left(\log_{10}\left(\frac{1}{n_{bins}}\right)r_j\right)}{n_{bins}} \qquad (1)$$

where R is the common rounded logarithmic prediction value of the bucket, $n_{bins}$ is the number of bins between two powers of ten, and $r_j$ is the predictions.

At activity 304, forecast metric module 204 rates the prediction values of prediction data 220 using one or more forecast metrics. As disclosed above, the one or more forecast metrics may comprise one or more functions that produce a numerical rating that compares the prediction values with actual values, such as, for example, bias, MRPS, RMRPS, MAE, RMAE, MAPE, CDF accuracy, and the like.

At activity 306, benchmark module 206 computes an ideal benchmark for the one or more forecast metrics used to rate the predictions values at activity 304. According to embodiments, benchmark module 206 calculates a best case value for each bucket, as described in more detail below. The best case value represents the forecast metric that would be achieved under the assumption of a perfect forecast. In this case, the best case values correspond to a forecast metric for a particular bucket rather than an individual forecast. Assuming that the process that generates the actual numbers is a Poisson process, benchmark module 206 may determine in what way the actuals would ideally be distributed when the predictions are perfect. For the Poisson distribution, this is the value of the forecast metric that is achieved when the actuals are Poisson-distributed around the predicted mean. This benchmark value defines the "best possible" value for the forecast metric. For example, the best possible RMAE under a Poisson process is generally not zero, but rather may be a value of up to 100%.

At activity 308, scaling module 208 determines a scaling adjustment to calculate non-ideal benchmarks. Scaling module 208 simulates non-Poissinian dispersions to determine the scaling adjustment. For example, scaling module 208 may parametrize variance and/or the one or more forecast metrics as a function of the rate, where the rate is associated with a scaling factor. Using the ideal benchmark and the scaling factor, scaling module 208 generates one or more non-ideal benchmarks to create a forecast rating scale.

At activity 310, evaluation module 210 determines a score, according to the forecast rating scale, for each bucket. The score corresponds to the forecast rating scale determined at activity 308, where a score for the best performance corresponds to a forecast metric value at or near the ideal benchmark. Evaluation module 210 may associate the benchmarks generated by scaling module 208 with text descriptors, such as, for example, "Perfect," "Excellent," "Good," "OK," "Fair," "Insufficient," "Unacceptable," and the like to contextualize the determined scores. According to embodiments, user interface module 214 may depict the score for each bucket as a benchmark chart (such as, for example, benchmark chart 1102a of FIG. 11A).

Figure 12A:
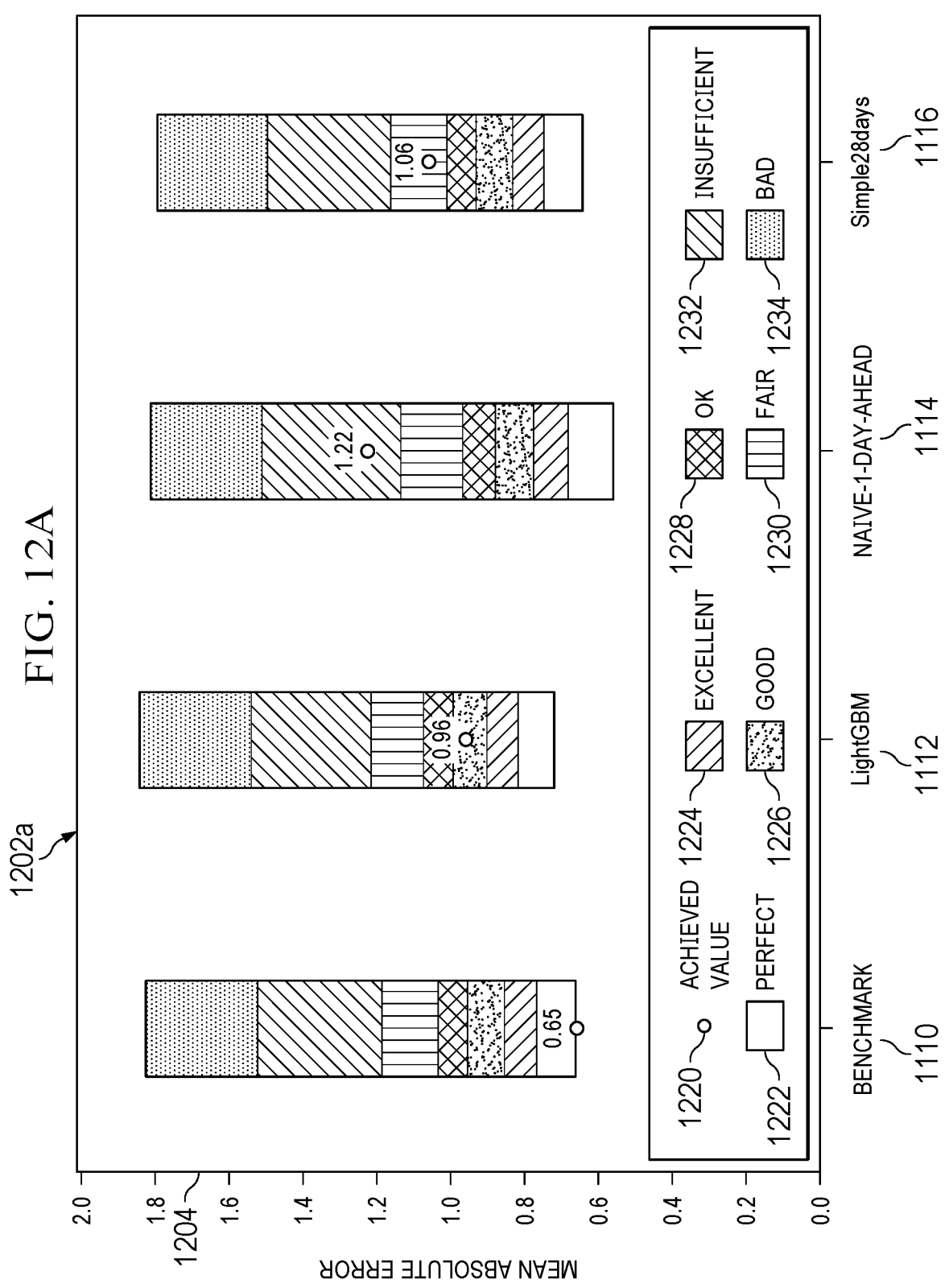
FIGS. 12A-12D illustrate forecast rating graphs for three forecast models and a benchmark model, in accordance with an embodiment.
Figure 12B:
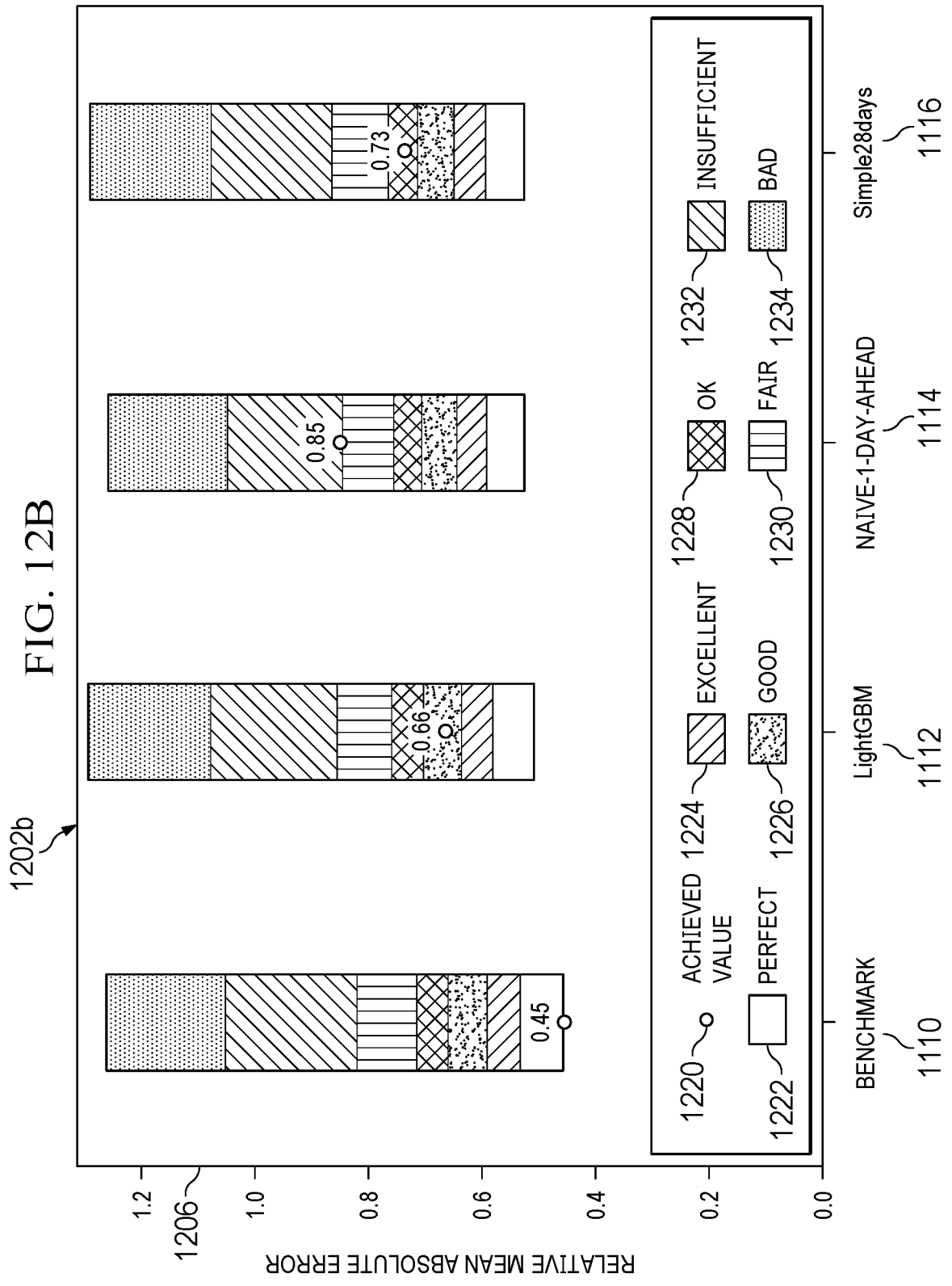
Figure 12C:
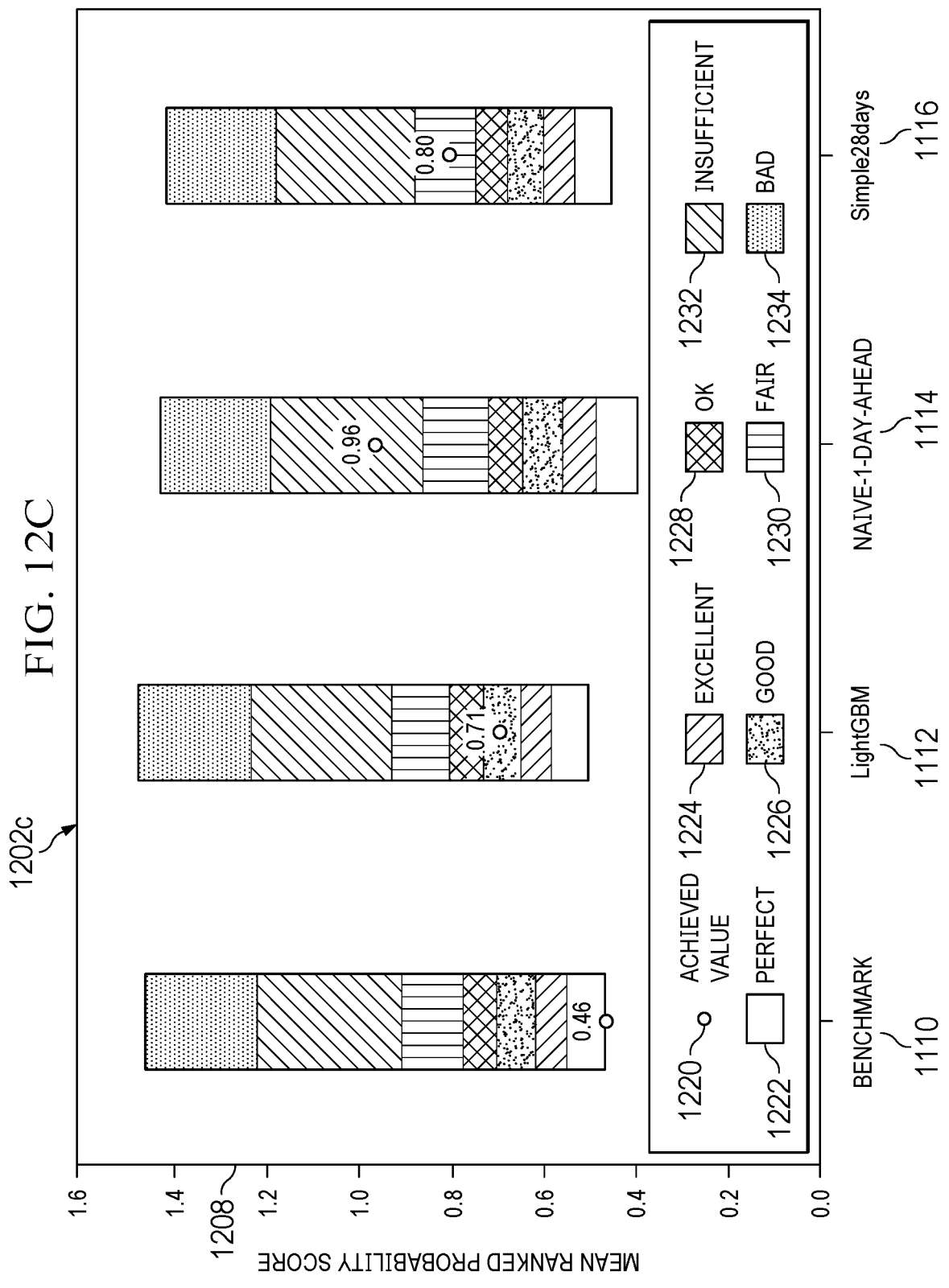
Figure 12D:
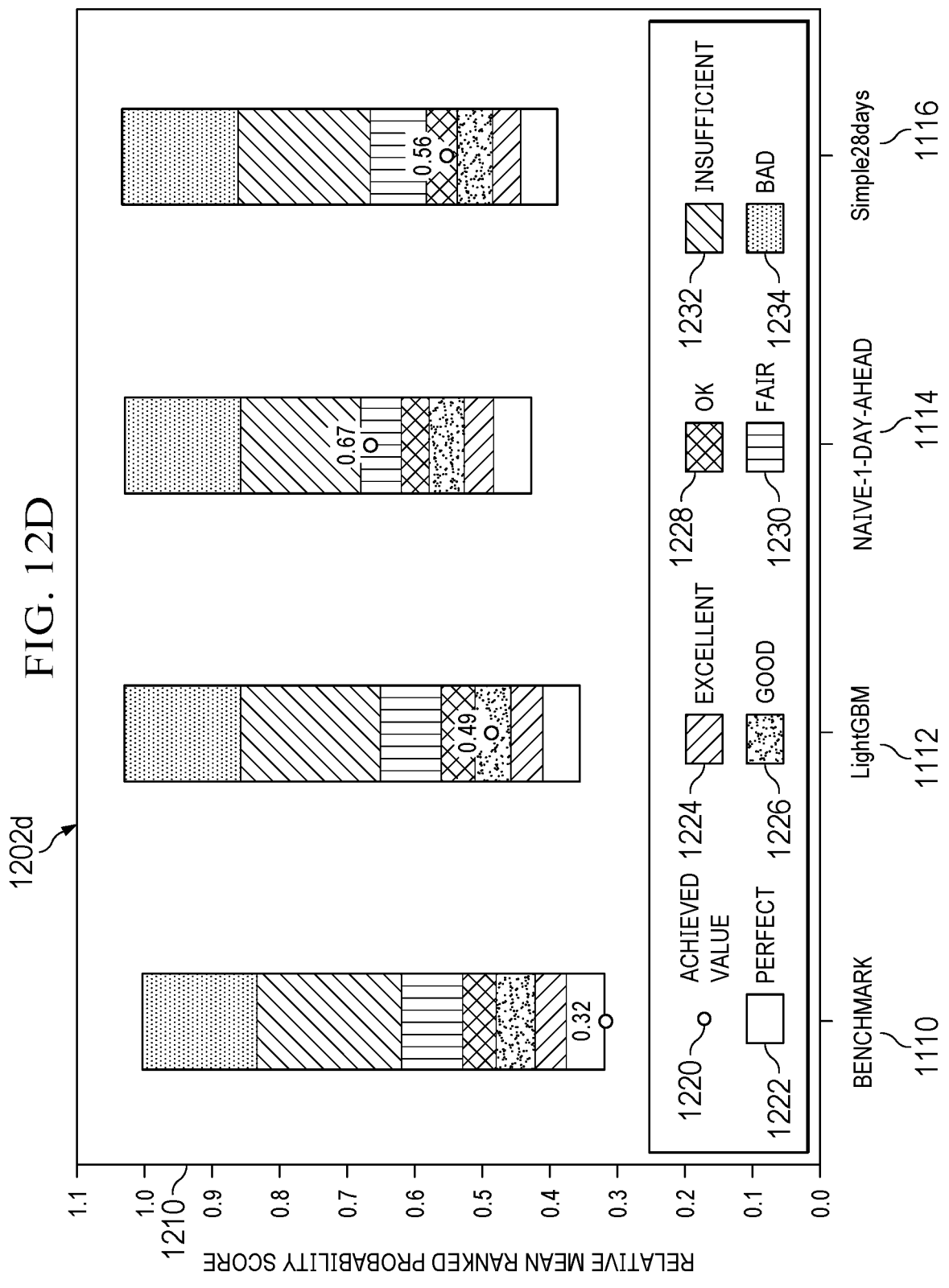

At activity 312, bucket and rating aggregation module 212 aggregates the bucket scores. In some embodiments, bucket and rating aggregation module 212 associates a percentage scale with the forecast rating scale determined at activity 308 and the text descriptors determined at activity 310, where the best rating corresponds to 100%, the worst rating corresponds to 0%, and each benchmark corresponds to a range of percentage values between 0% and 100%. By way of further illustration only and not by way of limitation, a "Perfect" score may any score greater than 90%, an excellent score may be any score between 90% and 75%, a good score may be any score between 60% and 75%, and so on. Bucket and aggregation module 212 may use a weighted sum to aggregate each bucket score to calculate an overall scaling-aware rating for the set of predictions and actuals. In other embodiments, bucket and rating aggregation module 212 computes reference values to determine an overall aggregated metric. For example, bucket and rating aggregation module 212 may compute the hypothetical overall metric score that would have been achieved had all the buckets achieved the actual metric score. According to embodiments, user interface module 214 may depict the overall score as a forecast rating graph (such as, for example, forecast rating graph 1202*a* of FIG. 12A).

FIGS. 4A-4D illustrate calibration diagrams 402*a*-402*d* for an ideal benchmark model, in accordance with an embodiment. X-axis 404 represents the number of observations of the number of sales of the product/location/day combination. Y-axis 406 represents the predicted probability value and the observed frequency value of the product/location/day combination. Calibration diagram 402*a*-402*d* show both observed frequency 408 and predicted probability 410 for the product/location/day combination. Calibration diagrams 402*a*-402*d* are based on the data shown in TABLE 1.

TABLE 1

|  | All | FOODS_3 | HOBBIES_2 | HOUSEHOLD_1 |
|---|---|---|---|---|
| Number of predictions n | 853,720 | 230,440 | 41,720 | 148,960 |
| Total sales $\Sigma_j\, s_j$ | 1,231,764 | 564,926 | 13,302 | 222,327 |
| Total prediction $\Sigma_j\, r_j$ | 1,224,013 | 559,992 | 13,478 | 221,818 |
| Bias factor $\Sigma_j\, r_j/\Sigma_j\, s_j$ | 0.9937 | 0.9913 | 1.0132 | 0.9977 |
| MAE | 0.665882 | 0.928584 | 0.247843 | 0.742213 |
| RMAE | 0.461515 | 0.378781 | 0.777327 | 0.497286 |
| MAPE | 0.283720 | 0.312904 | 0.170562 | 0.298539 |
| MSE | 1.803334 | 3.395871 | 0.354124 | 1.566494 |
| CDF Accuracy | 0.997956 | 0.999040 | 0.996490 | 0.998313 |

According to embodiments, benchmark module 206 may construct a "perfect" Poissonian forecast for a given dataset of sales values $s_j$, using a heuristic, which is equivalent to expectation maximization, where the integer outcomes of a given set of observed sales $s_j$ are the results of Poisson processes with rates $t_j$. Given the known observations $s_j$, to create plausible predictions $t_j$, benchmark module 206 calculates the conditional probability to have predicted t given observation s (i.e., P(t|s)) using Equation 2:

$$P(t|s) = \frac{P_{Poi}(s|t)P_{rate}(t)}{P_{observation}(s)} \tag{2}$$

where $$P_{Poi}(s|t) = \frac{e^{-t}t^s}{s!}$$

is the Poisson distribution, $P_{observation}(s)$ is the probability of a certain outcome, and $P_{rate}(t)$ is the prior probability density function that describes the distribution of the rates. An approximation for $P_{rate}(t)$ may be used to calculate P(t|s), which benchmark module 206 may calculate using an iterative algorithm, as described by Equations 3-7. For the first iteration, $P_0(t)$, benchmark module 206 uses an exponential distribution, as shown in Equation 3:

$$P_0(t) = \frac{1}{\langle s \rangle} e^{-\frac{t}{\langle s \rangle}} \tag{3}$$

where the mean value is set to match the mean observed sales, as shown in Equation 4:

$$\langle s \rangle = \sum_{s=0}^{\infty} s P_{observation}^k(s) \tag{4}$$

where $$P_{observation}^{(k)}(s)$$

is the resulting probability to observe s, given the prior for the rates $P_k(t)$. Benchmark module 206 may calculate $$P_{observation}^{(k)}(s)$$

using Equation 5:

$$P_{observation}^{(k)}(s) = \int_{t=0}^{\infty} P_k(t) P_{Poi}(s|t) \tag{5}$$

where the index k denotes the iterations of the algorithm. In general, $$P_{observation}^{(0)}(s)$$

and $P_{observation}(s)$ differs substantially in the first iteration.

To improve the probability density function $P_k(t)$, benchmark module 206 applies the update rule of Equation 6 iteratively:

$$\tilde{P}_{k+1}(t) = P_k t \sum_{s=0}^{\infty} P_{Poi}(s|t) \frac{P_{observation}(s)}{P_{observation}^{(k)}(s)} \tag{6}$$

where the probability density that contributes to the observations that are underpredicted are boosted. The updated probability distribution $\tilde{P}_{k+1}(t)$ is unnormalized, such that benchmark module 206 performs the normalization as shown in Equation 7:

$$P_{k+1}(t) = \frac{\tilde{P}_{k+1}(t)}{\int_{x=0}^{\infty} dx \tilde{P}_{k+1}(x)} \qquad (7)$$

before the update rule of Equation 6 is performed again.

To provide a set of plausible predictions $t_j$, benchmark module 206 samples one prediction $t_j$ for each observation $s_j$ via $t_j \sim P(t|s_j)$. Applying the iterative procedure on all data categories (e.g., product groups, locations, and the like) separately, benchmark module 206 obtains unbiased Poissonian forecasts that could have yielded the set of sales $s_j$. According to embodiments, benchmark module 206 performs as predetermined quantity of iterations (such as, for example, twelve iterations is typically sufficient to reach an approximation of the ideal artificial forecast), such that $$P_{observation}^{(k)}(s) \approx P_{observation}(s)$$

while, for each prediction t, the resulting sales s are Poisson-distributed, as shown in calibration diagrams 402a-402d.

Figure 5:
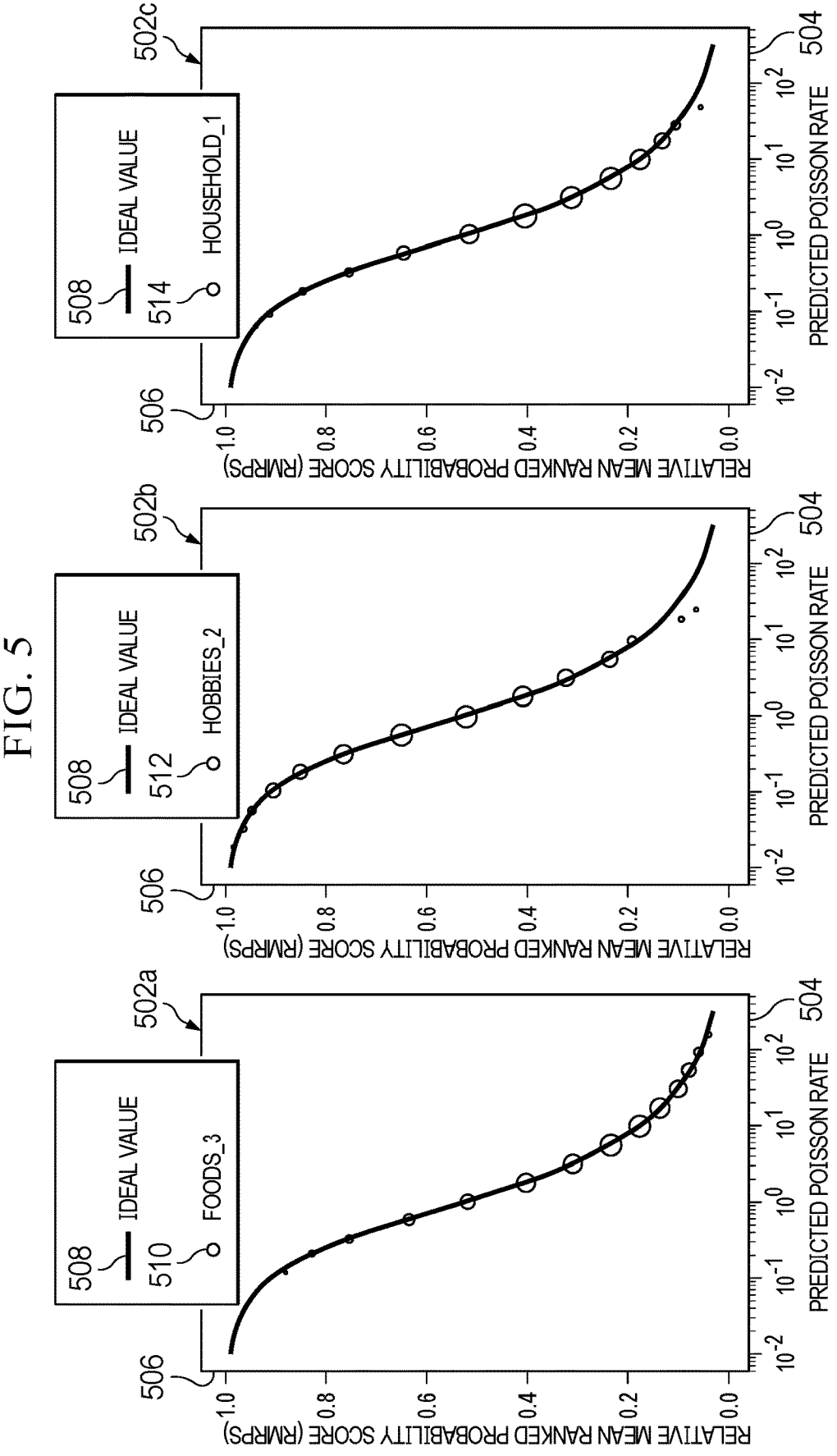
FIG. 5 illustrates ideal benchmark model charts of the relative mean ranked probability score metric for three different product categories, in accordance with an embodiment.

FIG. 5 illustrates ideal benchmark model charts 502a-502c of the relative mean ranked probability score metric for three different product categories, in accordance with an embodiment. X-axis 504 of ideal benchmark model charts 502a-502c corresponds to the predicted Poisson rate. Y-axis of ideal benchmark model charts 502a-502c corresponds to the RMRPS score. Ideal benchmark charts 502a-502c show ideal value 508 compared to the value for FOODS_3 510 in ideal benchmark chart 502a, HOBBIES_2 512 in ideal benchmark chart 502b, and HOUSEHOLD_1 514 in ideal benchmark chart 502c. Ideal benchmark model charts 502a-502c show that the ideal performance model is the same for the product categories of FOODS_3 510, HOBBIES_2 512, AND HOUSEHOLD_1 514.

On the most fundamental level, each individual prediction $r_j$ comes with a different expectation on how to distribute $s_j$ and the ideal metric value. For each prediction $r_j$, however, the achieved values of the metric varies as much as the individual sales values $s_j$, since, due to the probabilistic nature of the process, the outcomes $s_j$ are sometimes lower or sometimes higher than $r_j$. Also, some forecast metrics, such as, for example, the CDF accuracy, cannot be computed meaningfully on the level of individual predictions and observations. Stratification module 202 therefore groups the predictions $r_j$ into buckets for evaluation. In embodiments, stratification module 202 bins prediction-outcome-pairs by buckets of predictions rather than outcomes to avoid the hindsight bias that is otherwise induced. Stratification module 202 may use logarithmically spaced buckets to avoid one bucket containing the majority of all predictions, as described above by Equation 1.

Bucketing solves two issues: (1) scaling forces the restriction of any judgement or rating to a group of predictions that are close together and for which the ideal values of metrics are similar, and (2) the probabilistic nature of the predictions forces consideration of ensembles of many outcomes. By grouping many predictions into a bucket of constant R, the achieved mean metric value may match the computed expectation value when the prediction is ideal. The number of bins $n_{bins}$ may thus solve the compromise between having sufficiently many predictions and observations in one bucket, while ensuring that all predictions in the bucket behave approximately equal. Ideal benchmark model charts 502a-502c illustrate the result of this procedure for the ideal benchmark model and $n_{bins}$=4, differentiated by department (FOODS_3 510, HOBBIES_2 512, and HOUSEHOLD_1 514). Ideal benchmark model charts 502a-502c further illustrate that the differences in the metric values exhibited in TABLE 1 is driven by the difference in the distribution of rates, not by a different performance, as the performance is the same for all departments for a given rate bucket R.

Figure 6:
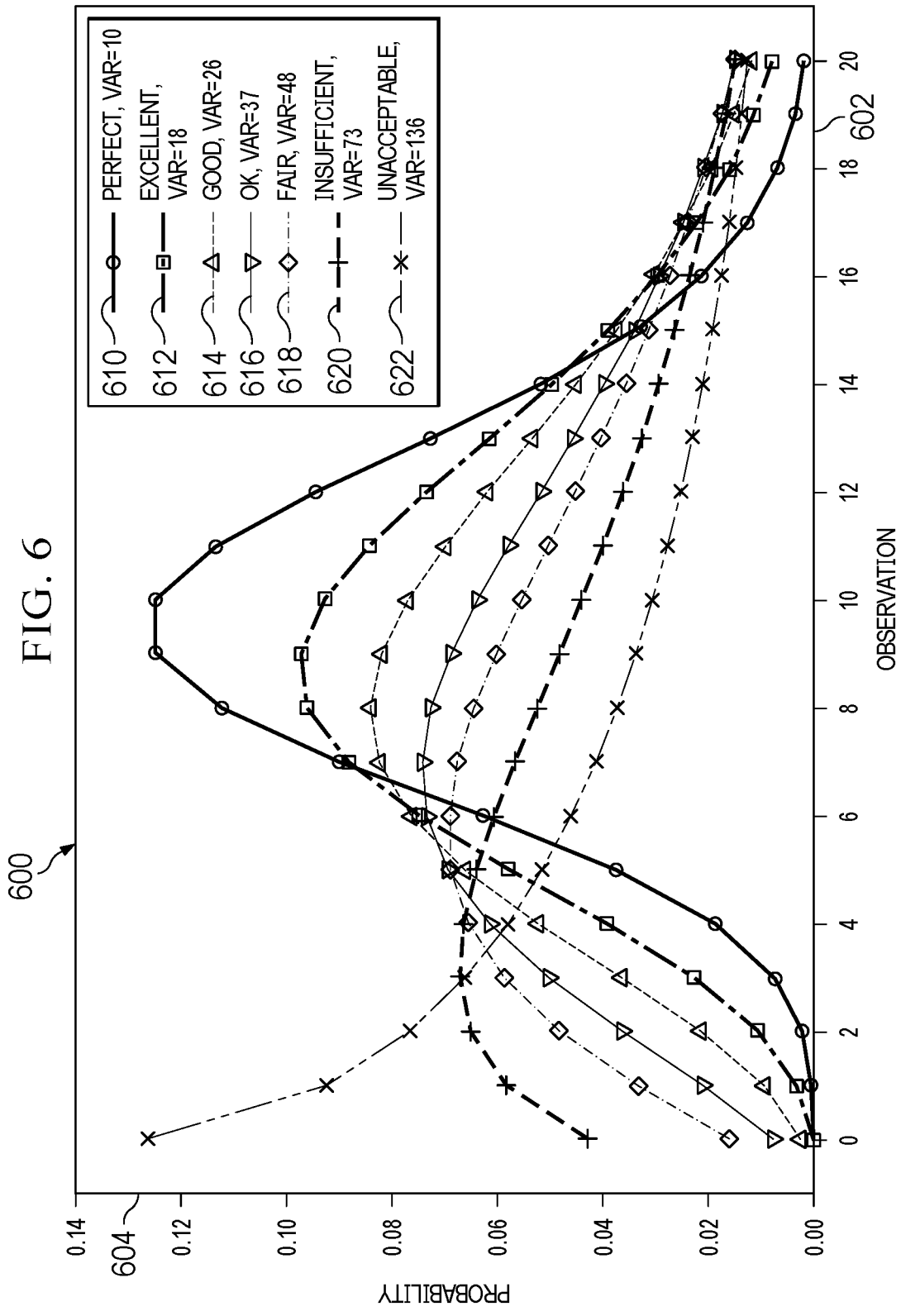
FIG. 6 illustrates a distribution chart for different variance values, in accordance with an embodiment.

FIG. 6 illustrates distribution chart 600 for different variance values, in accordance with an embodiment. X-axis 602 of distribution chart 600 corresponds to the number of observations, and Y-axis 604 of distribution chart corresponds to the probability. Distribution chart 600 compares models that are determined to be "Perfect" 610 (variance of ten), "Excellent" 612 (variance of eighteen), "Good" 614 (variance of twenty-six), "OK" 616 (variance of thirty-seven), "Fair" 618 (variance of forty-eight), "Insufficient" 620 (variance of seventy-three), and "Bad" 622 (variance of one hundred thirty-six). Variance values of the particular models used may vary depending on the application, the industry, and the like.

Characterizing the ideal case is not sufficient for judging forecasts in practice, as the ideal case is not achievable unless exceptional data is available that comprises all factors that influence the true Poisson rate $t_j$. The distance of how "close" the model performance is to ideal may be graded using one or more intermediate benchmarks to judge to which extent the departure from the ideal case is acceptable or problematic, regarding both the level of bias and the level of noise. Perfect performance of a forecast model may be the best possible value of a metric. For a Poisson prediction, the best possible value of any metric is the value achieved for the outcomes drawn from the predicted distribution (for example, the ideal value is one for the bias factor). That is, there is one way to have an ideal forecast, and the expectation value of the metric under the distribution is unique. However, multiple factors may contribute to the performance of a non-ideal forecast, such as, for example, bias, noise, finite stock effects, zero inflation, unfulfilled Poisson assumption in practice, missing features, and the like. Further, the value of a metric at which the line to "unacceptable" is crossed depends on the industry. For example, grocery forecasts for a horizon of one day may be expected to be more precise than apparel forecasts on a horizon of six months. Rather than using a uniform definition of non-ideal models, scaling module 208 uses a parametrization that grasps the scaling of imperfect model behavior. Distribution chart 600 shows an example set of "excellent" to "unacceptable" models with variance and bias values at prediction $r_j$=10, as shown in TABLE 2.

TABLE 2

| Rating | Perfect | Excellent | Good | OK | Fair | Insufficient | Unacceptable |
|---|---|---|---|---|---|---|---|
| Variance at $r_j$ = 10 | 10 | 18 | 26 | 37 | 48 | 73 | 136 |
| Bias factor | 1.0 | 1.015 | 1.03 | 1.07 | 1.2 | 2 | 4 |

These parameters thereby fully define the forecast rating scale. Fewer or more descriptive ranges may be used according to particular needs, which then requires fewer or more parameters.

Figure 7:
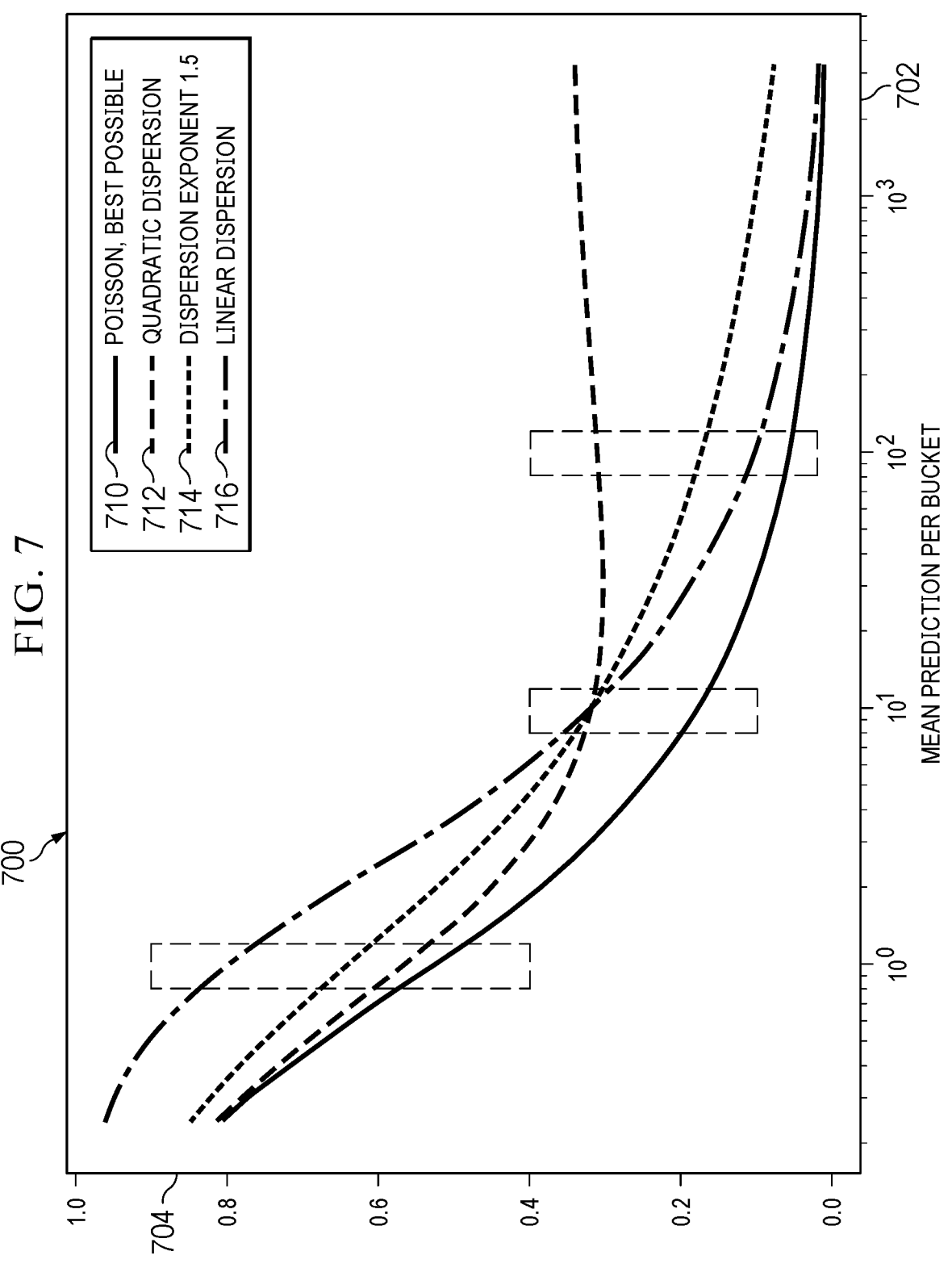
FIG. 7 illustrates a scaling chart for the relative mean ranked probability score metric at different scales, in accordance with an embodiment.

FIG. 7 illustrates scaling chart 700 for the relative mean ranked probability score metric at different scales, in accordance with an embodiment. X-axis 702 of scaling chart 700 corresponds to the mean prediction per bucket. Y-axis 704 of scaling chart 700 corresponds to the RMRPS value per bucket. Scaling chart 700 compares Poisson dispersion 710, quadratic dispersion 712, exponent 1.5 dispersion 714, and linear dispersion 716 for a variance of thirty at a prediction of ten. Scaling chart 700 of FIG. 7A illustrates the differences among the expected RMRPS values of Poisson dispersion 710 and different scaling factors corresponding to quadratic dispersion 712, exponent 1.5 dispersion 714, and linear dispersion 716 as a function of rate.

Figure 8:
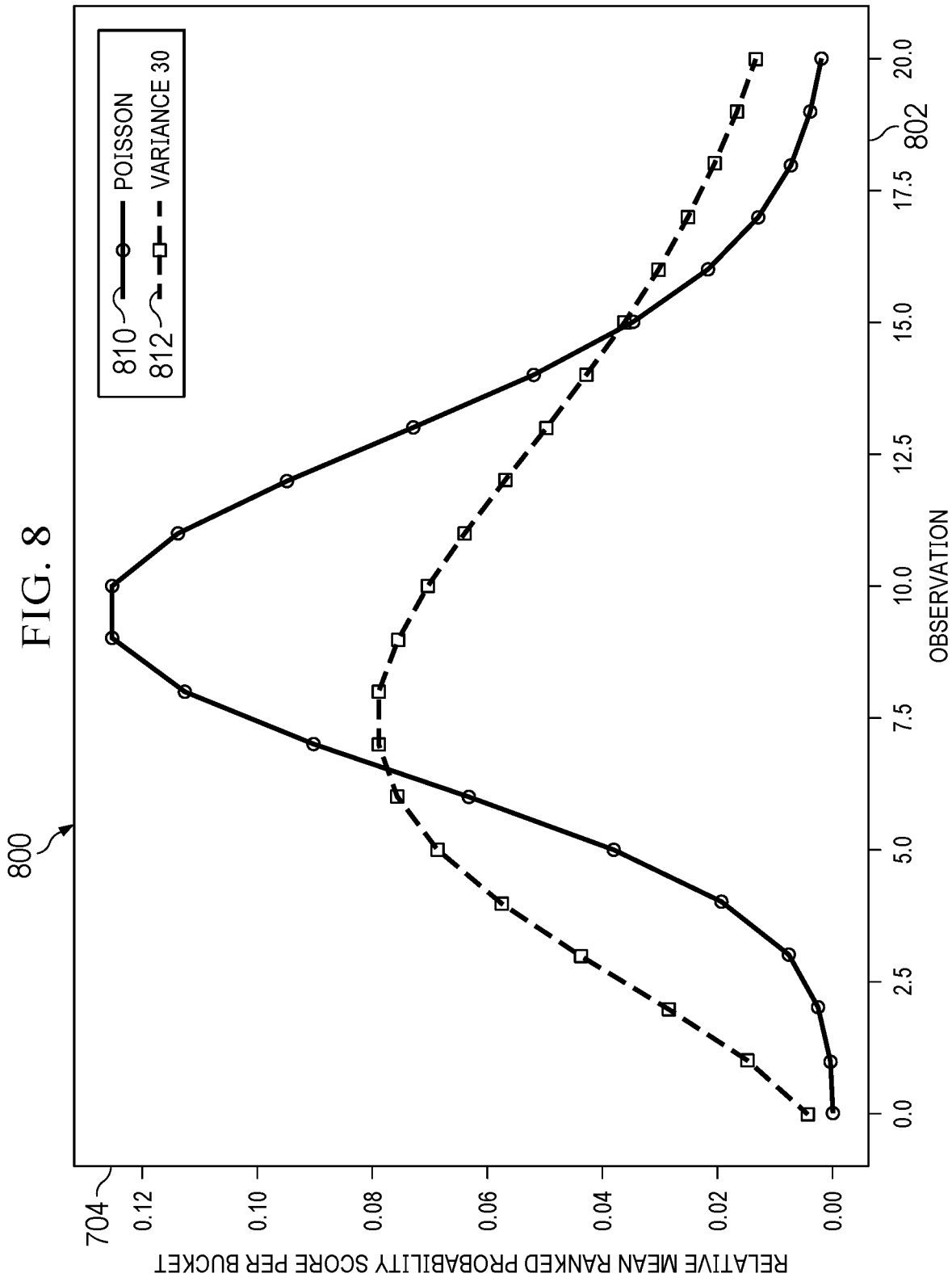
FIG. 8 illustrates a distribution chart for the relative mean ranked probability score per bucket at different observation values, in accordance with an embodiment.

FIG. 8 illustrates distribution chart 800 for the relative mean ranked probability score per bucket at different observation values, in accordance with an embodiment. X-axis 802 of distribution chart 800 corresponds to the number of observations. Y-axis 704 of distribution chart 800 corresponds to the RMRPS score per bucket. Distribution chart 800 of FIG. 8 illustrates the expected RMRPS values for the distribution of observations for "good" forecast 812 compared to Poisson distribution 810. "Good" forecast 812 is a negative-binomial distribution corresponding to a variance of thirty and a rate of ten, within an intermediate benchmark range corresponding to the text descriptor "good." However, to obtain a rating scale that is scaling-aware, scaling module 208 determines intermediate benchmarks for rates that are scaled up and scaled down. For example, when the variance value of thirty is considered "good" for a rate of ten, scaling module 208 may determine what variance values are considered "good" for a rate of one, a rate of one hundred, etc. Scaling module 208 uses Equation 8, which parametrizes the variance as a function of the rate $\mu$ to determine a scaling factor:

$$\text{variance} = \mu + f(\mu^\gamma) \qquad (8)$$

where $\gamma$ is the scaling factor. A $\gamma$ value of two corresponds to quadratic overdispersion 712, a $\gamma$ value of 1.5 corresponds to exponent 1.5 dispersion 714, and a $\gamma$ value of one corresponds to linear overdispersion 716. As shown in scaling chart 700, quadratic dispersion 712 is benevolent for large rates and strict for small rates. On the other hand, linear dispersion 716 shows the opposite behavior, that is, it judges large rates strictly and is benevolent on small rates. The intermediate dispersion, exponent 1.5 dispersion 714, is relatively not benevolent or strict on both small and large rates.

Figure 9A:
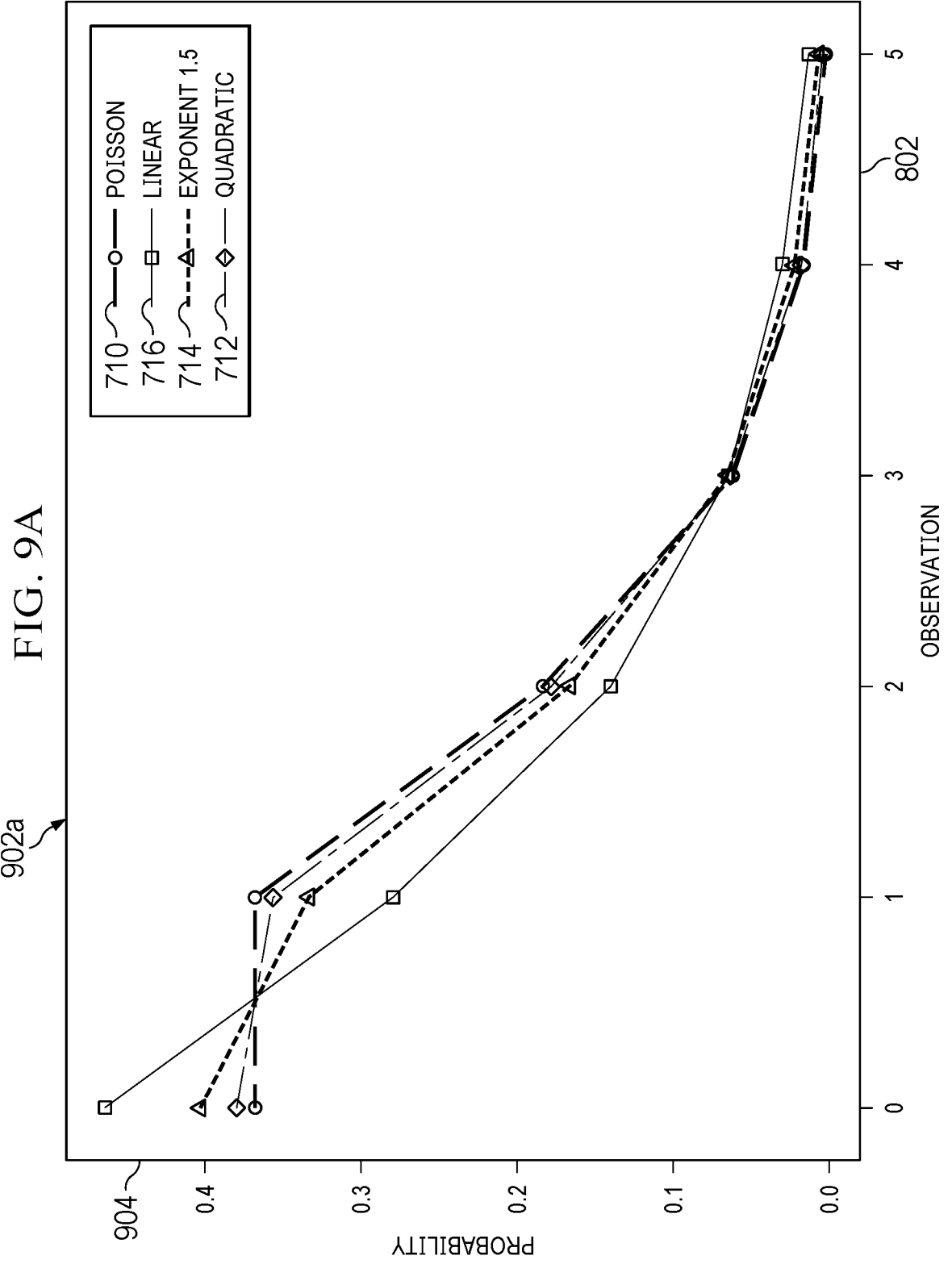
FIGS. 9A-9B illustrate dispersion charts for the probability at different observation values, in accordance with an embodiment.
Figure 9B:
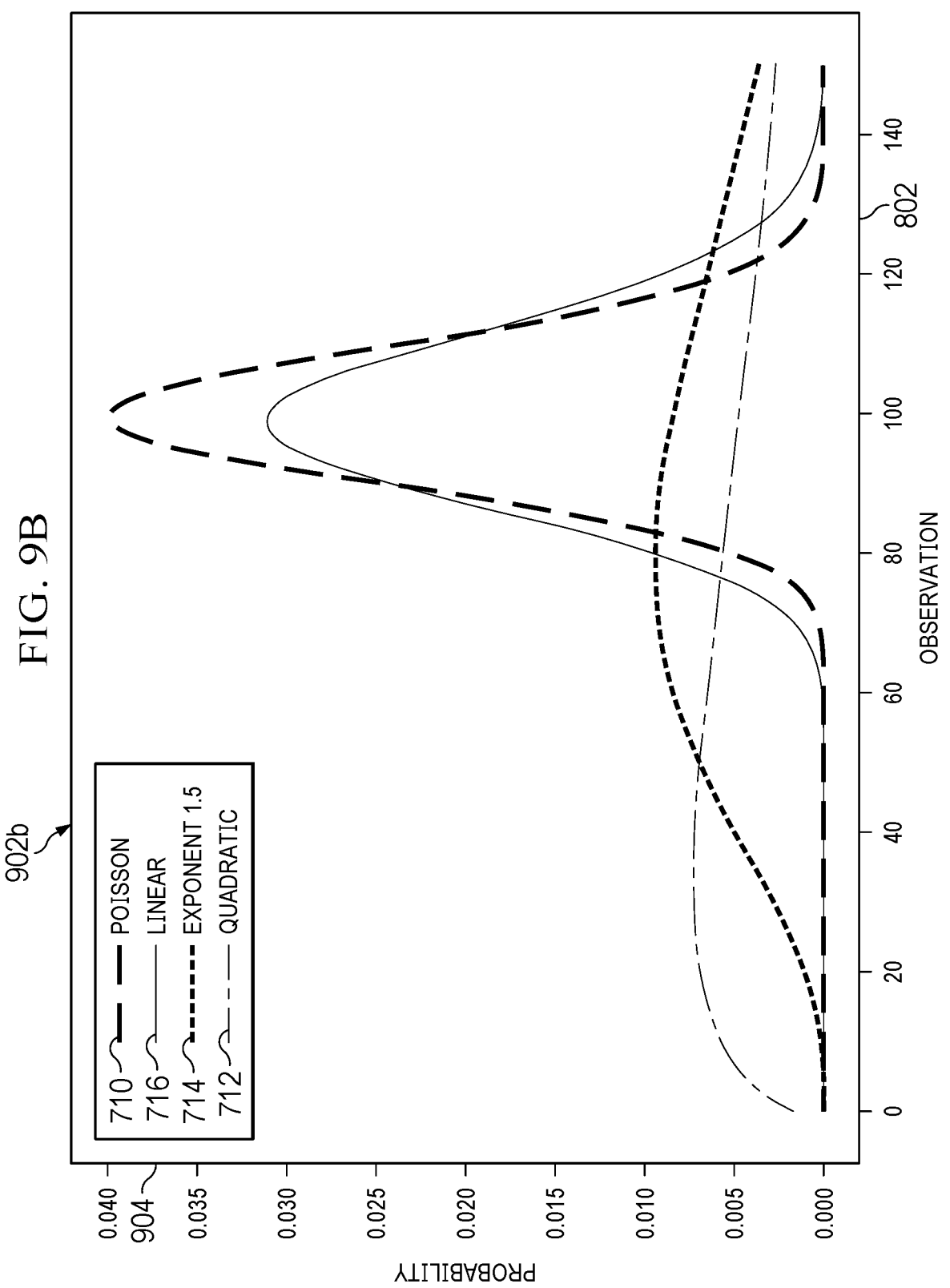
Figure 10A:
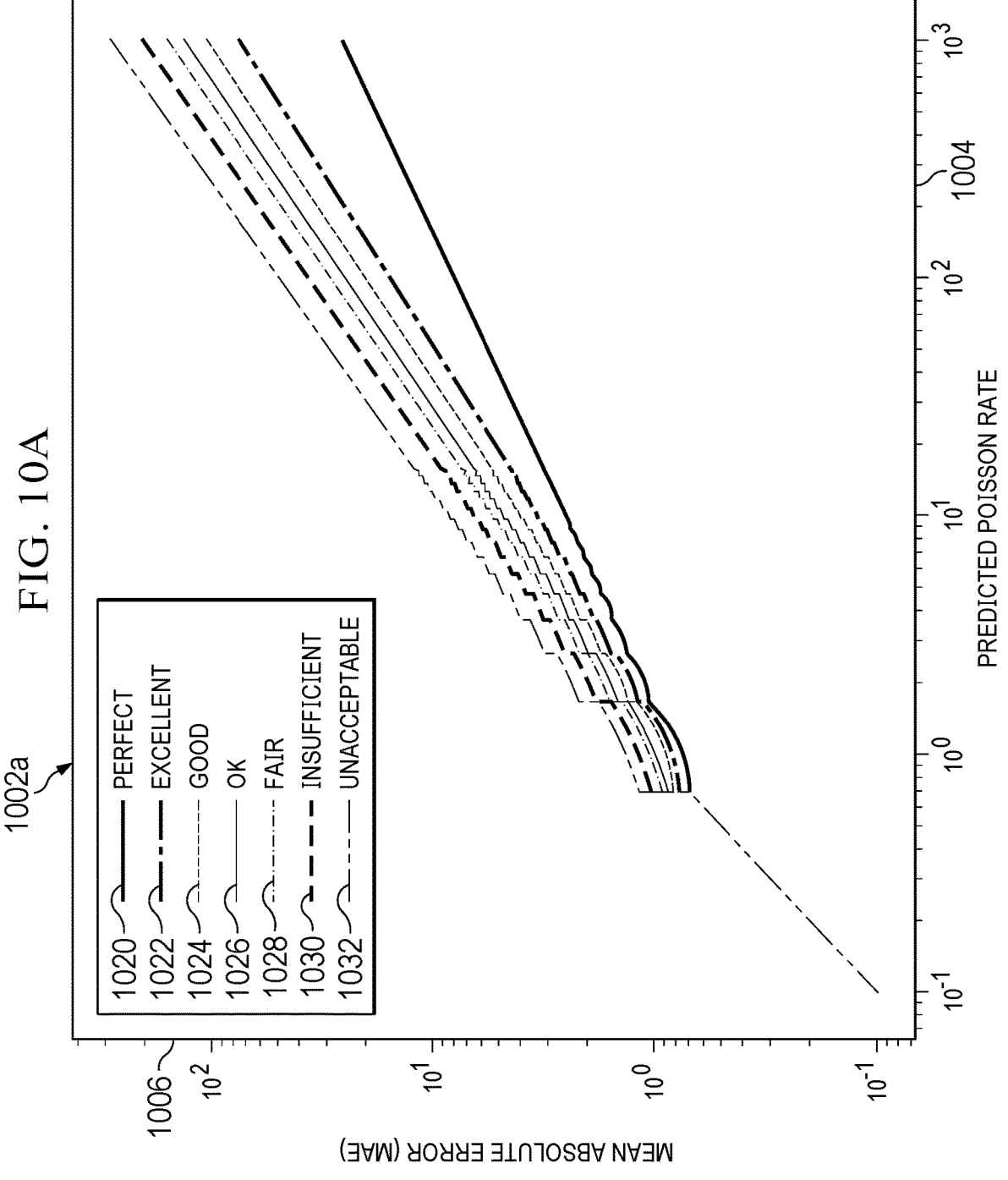
FIGS. 10A-10F illustrate benchmark charts for six forecast metrics, in accordance with an embodiment.
Figure 10B:
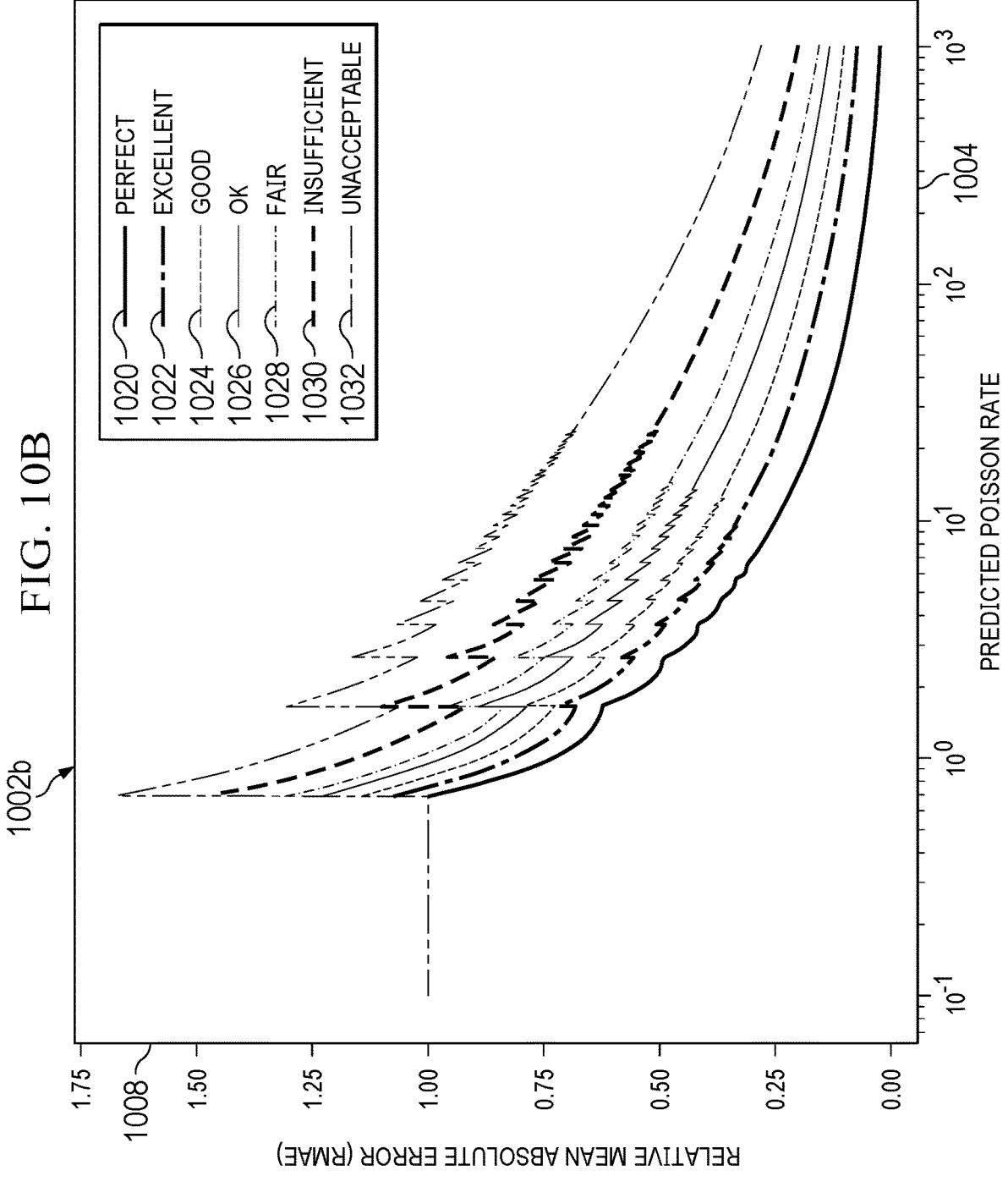
Figure 10C:
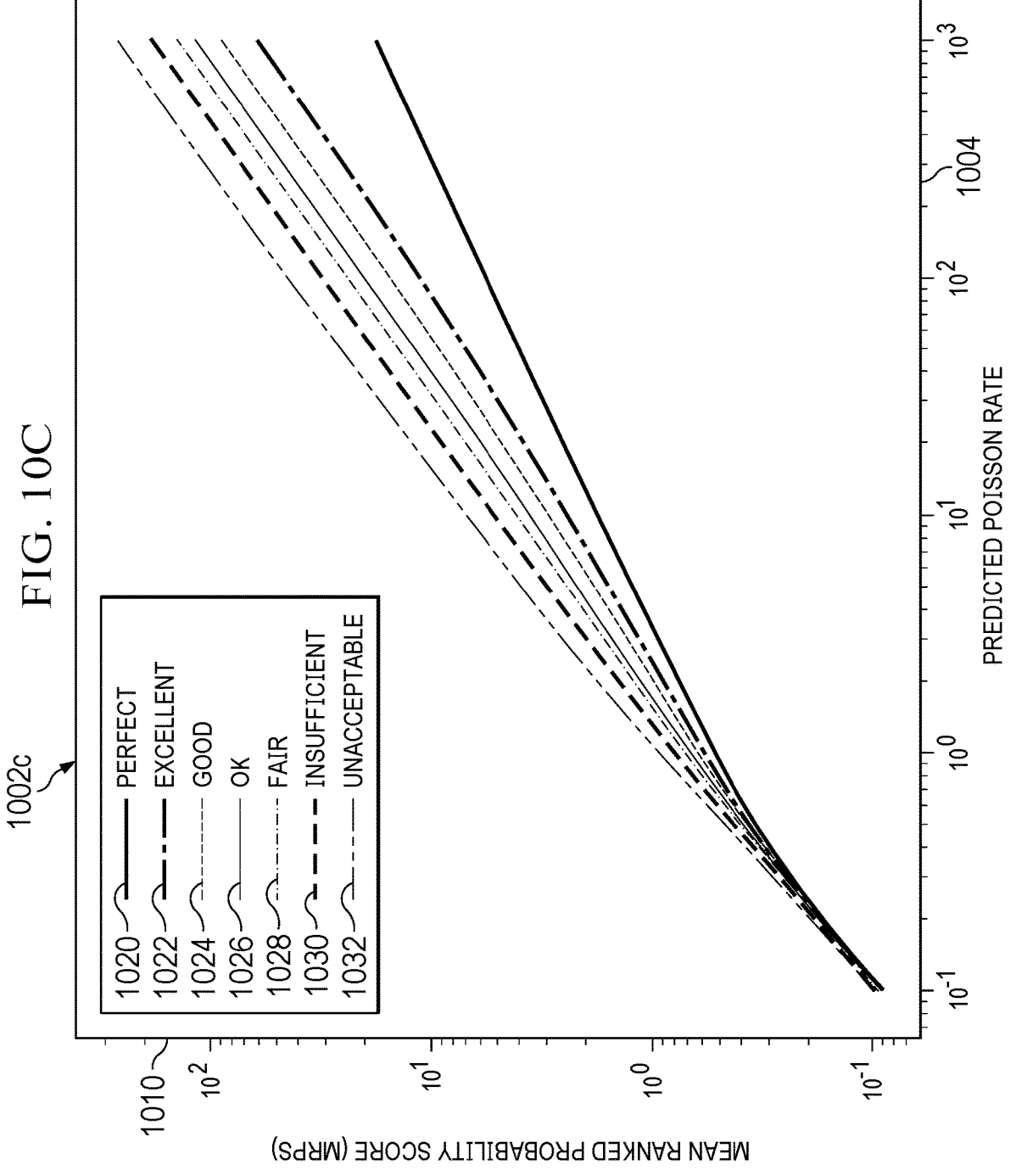
Figure 10D:
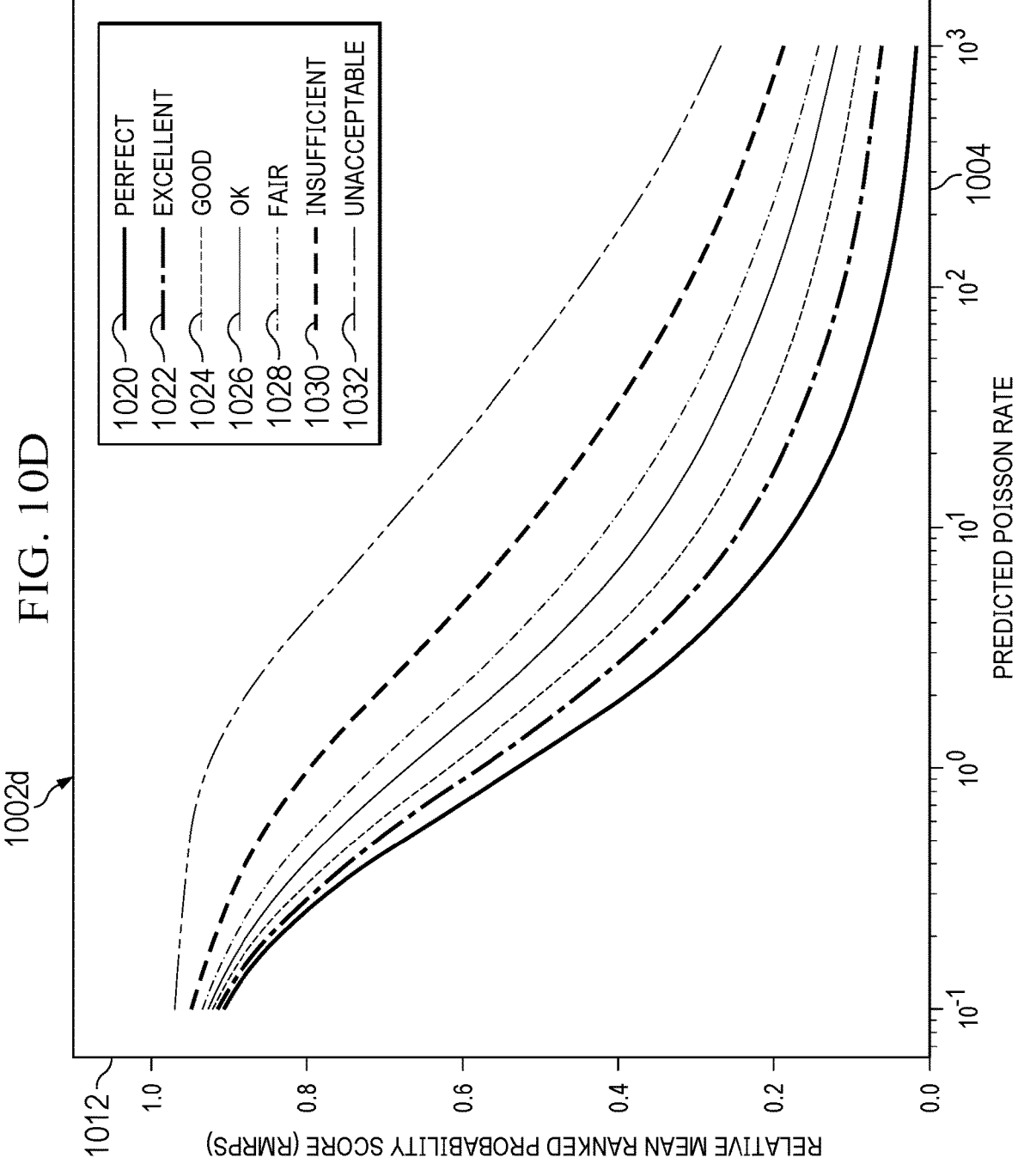
Figure 10E:
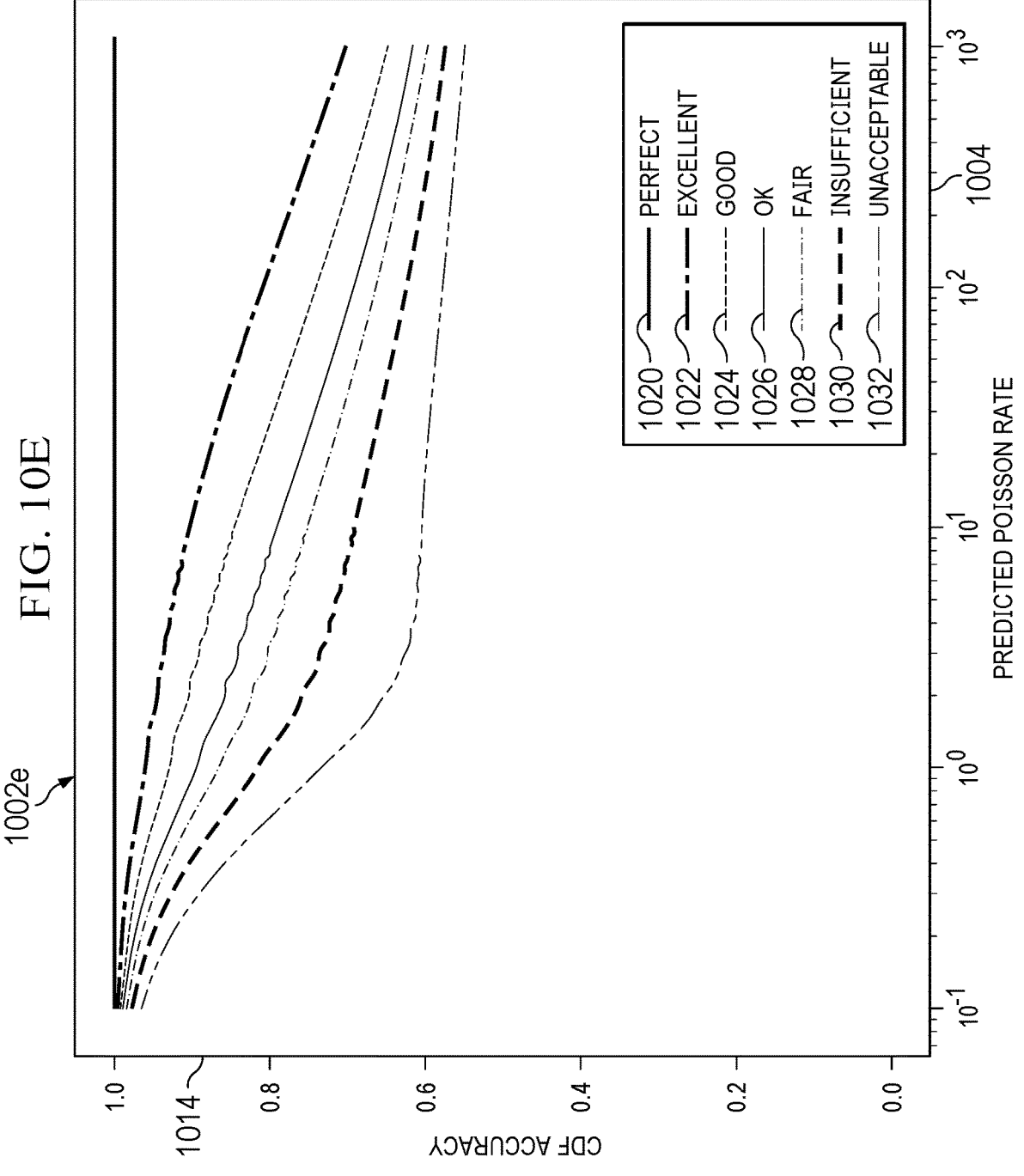
Figure 10F:
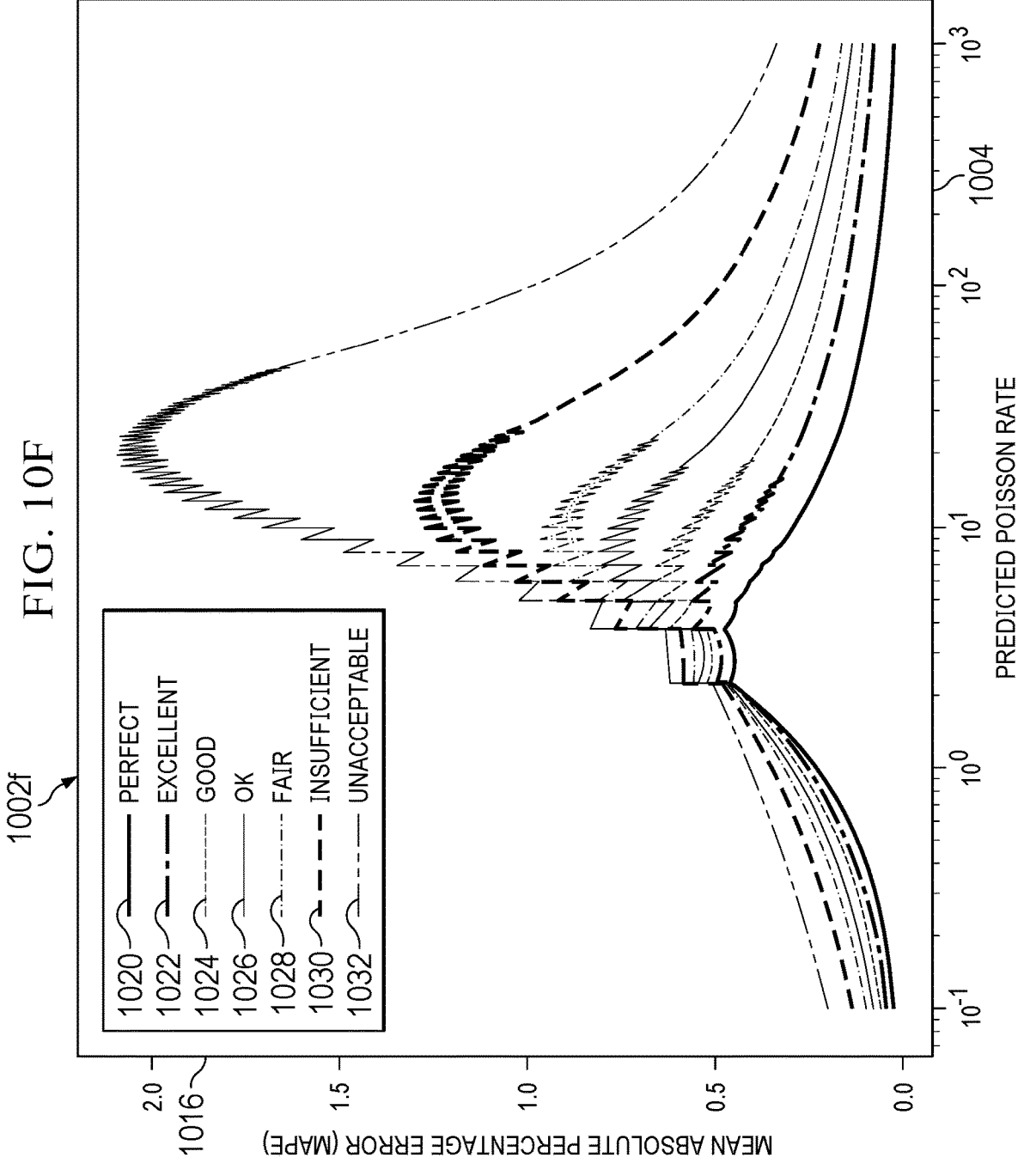

FIGS. 9A-9B illustrate dispersion charts 902a-902b for the probability at different observation values, in accordance with an embodiment. X-axis 802 of dispersion charts 902a-902b corresponds to the number of observations. Y-axis 904 of dispersion charts 902a-902b corresponds to the probability. Dispersion chart 902a compares Poisson dispersion 710, quadratic dispersion 712, exponent 1.5 dispersion 714, and linear dispersion 716 scaled down from a rate of ten, like in dispersion chart 700 of FIG. 7, to a rate of one. Dispersion chart 902b compares Poisson dispersion 710, quadratic dispersion 712, exponent 1.5 dispersion 714, and linear dispersion 716 scaled up from a rate of ten to a rate of one hundred. The scaled distributions for rates of one and one hundred, shown in dispersion chart 902a of FIG. 9A and dispersion chart 902b of FIG. 9B, respectively, reinforce that quadratic dispersion 712 is pessimistic on the larger rate of one hundred, linear dispersion 716 is pessimistic on the smaller rate of one, and exponent 1.5 dispersion 714 is relatively balanced.

In addition, or as an alternative, scaling module 208 may determine the scaling factor using the statistical argument that when summing many negative-binomial-distributed random variables, the distribution of the sum behaves like a negative-binomial. When non-Poissonian noise in the granular events is perfectly correlated, the process corresponds to choosing one rate out of the I-distribution, which draws the random variables out of the same Poisson distribution corresponding to that rate. The result is a negative-binomial-two-distributed variable. When the noise is fully uncorrelated, the process corresponds to choosing a new rate out of the I'-distribution for each Poisson draw. The resulting sum is a negative-binomial-one-distributed variable. That is, in the former case, fluctuations are coherently enhanced by summing, in the latter, fluctuations cancel in the limit of many draws.

In an example of a retailer, the selling rate $r_j$ may be written as Equation 9:

$$r_j = n_{customers} \cdot P_{product_j} \qquad (9)$$

where $n_{customers}$ is the number of customers that are offered the product on a given day and $P_{product_j}$ quantifies the probability that a customer buys the product. A portion of the uncontrolled systematic errors that $r_j$ suffers from originally affects $n_{customers}$, and thereby impacts all products in the same way. On the other hand, a portion of the systematic uncertainty is product-dependent. Thus, a portion of the systematic uncertainty that affects slow movers cancels when considering fast movers. In this example, quadratic overdispersion 712 ($\gamma=2$) is therefore overly pessimistic in the fast movers, because assuming that a fast mover behaves like many slow movers whose systematic errors accumulate leads to extreme variances (assuming all systematic uncertainty affects only $n_{customers}$). On the other hand, linear dispersion 716 ($\gamma=1$) is overly optimistic (assuming no uncertainty at all affects $n_{customers}$), so the resulting distribution for fast movers is almost Poissonian. Exponent 1.5 dispersion 714 ($\gamma=1.5$) is generally a good fit, including in this example, and corresponds to partially correlated non-Poissonian noise. While the particular example of a retailer is shown and described with particular parameters, different parameters may be used according to particular need.

FIGS. 10A-10F illustrate benchmark charts 1002a-1002f for six forecast metrics, in accordance with an embodiment. The forecast metrics are MAE in benchmark chart 1002a, RMAE in benchmark chart 1002b, MRPS in benchmark chart 1002c, RMRPS in benchmark chart 1002d, CDF accuracy in benchmark chart 1002e, and MAPE in benchmark chart 1002f. X-axis 1004 of benchmark charts 1002a-1002f corresponds to the predicted Poisson rate. Y-axis 1006 of benchmark chart 1002a corresponds to the MAE value, Y-axis 1008 of benchmark chart 1002b corresponds to the RMAE value, Y-axis 1010 of benchmark chart 1002c corresponds to the MRPS value, Y-axis 1012 of benchmark chart 1002d corresponds to the RMRPS value, Y-axis 1014 of benchmark chart 1002e corresponds to the CDF accuracy value, and Y-axis 1016 of benchmark chart 1002f corresponds to the MAPE value. Benchmark charts 1002a-1002f show the boundary lines for buckets that are considered "Perfect" 1020, "Excellent" 1022, "Good" 1024, "OK" 1026, "Fair" 1028, "Insufficient" 1030, and "Unacceptable" 1032. Although benchmark charts 1002a-1002f are shown and described as comprising boundary lines for forecasts that are considered Perfect" 1020, "Excellent" 1022, "Good"

1024, "OK" 1026, "Fair" 1028, "Insufficient" 1030, and "Unacceptable" 1032, embodiments contemplate any qualitative description for forecast rating. Additionally, specific values and distributions of the boundary lines may differ according to different industries and/or applications.

Figure 11B:
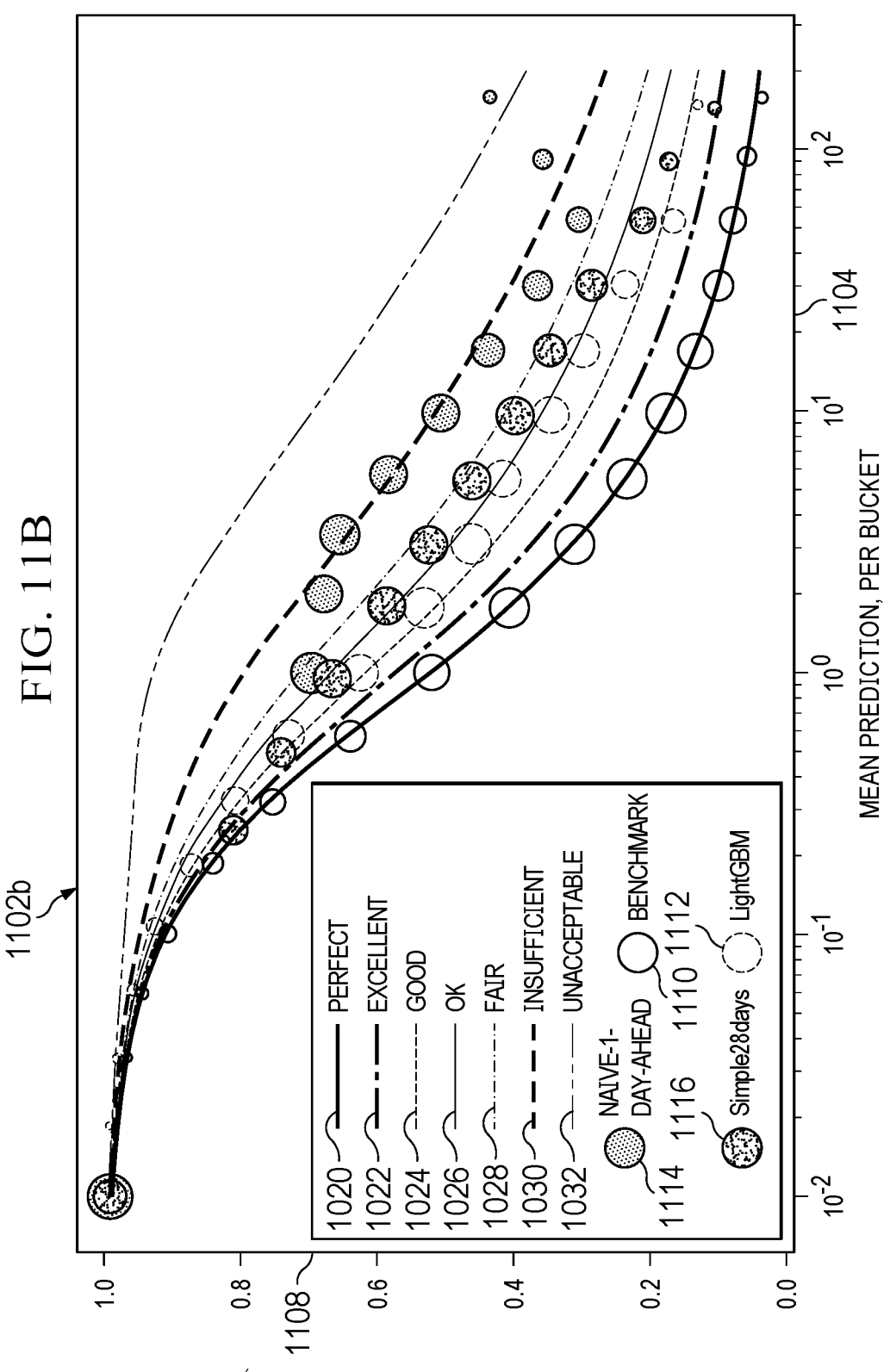

FIGS. 11A-11B illustrate benchmark charts 1102a-1102b for three prediction models 1112-1116 and benchmark model 1110, in accordance with an embodiment. Benchmark charts 1102a-1102b compare benchmark model 1110, LightGBM 1112, naïve-one-day-ahead 1114, and simple28 days 1116. Benchmark chart 1102a plots prediction models 1112-1116 and benchmark model 1110 against ideal bias 1118, and benchmark chart 1102b plots prediction models 1112-1116 and benchmark model 1110 against a rating scale. X-axis 1104 of benchmark charts 1102a-1102b corresponds to the mean prediction per bucket. Y-axis 1106 of benchmark chart 1102a corresponds to the bias factor per bucket, and Y-axis 1108 of benchmark chart 1102b corresponds to the RMRPS score per bucket. Like benchmark charts 1002a-1002f, benchmark chart 1102b shows boundary lines for buckets that are considered "Perfect" 1020, "Excellent" 1022, "Good" 1024, "OK" 1026, "Fair" 1028, "Insufficient" 1030, and "Unacceptable" 1032. Forecast rating system 110 generates benchmark charts 1102a-1102b by providing actual sales data into the artificial forecast model. The sales data is from ten retail locations of a particular supply chain network across the United States between Jan. 1, 2015 and May 22, 2016.

According to embodiments, benchmark model 1110 may be generated by benchmark model 208, as disclosed above. LightGBM 1112 is a forecast model that uses an implementation of gradient boosting framework with a tree-based learning algorithm. In this example, the LightGBM 1112 is trained with a Poisson objective and RMSE as a metric and is designed to have a relatively strong performance. Naïve-one-day-ahead 1114 is a forecast model that uses a simple one-day-ahead heuristic that uses the actual sales value from the previous day as a prediction for sales of the current day and is designed to a have a relatively poor performance. Simple28 days 1116 is a forecast model that averages data from the previous twenty-eight days over weekdays for each evaluation level and is designed to have a worse performance than LightGBM 1112 and a better performance than naïve-one-day-ahead 1114.

To evaluate the bias and the noise on the models, forecast rating system 110 buckets and plots the models for bias and the relative mean ranked probability score as shown in benchmark charts 1102a-1102b. In this example, forecast rating system 110 clips the predictions at 0.01 (which gives predictions with $r_j$<0.01 an advantage due to underpredicting on average), and clips the bias at ten and 0.1 (which gives the predictions an advantage). The representations provide for scaling-aware assessment of the models.

In benchmark chart 1102a, benchmark model 1110 is nearly perfect by construction, and LightGBM 1112 still exhibits a relatively high performance of bias for predicted rates of one and above. For smaller rates, benchmark model 1110 remains unbiased, while smaller LightGBM-predictions (r<0.1) are typically underpredictions. Naïve-one-day-ahead 1114 predictions contain many zero-predictions (which are clipped to 0.01), which are typically strong under-forecasts. When a product is not sold on a given day, the prediction for naïve-one-day-ahead 1114 for the next day becomes zero, but the expectation value of sales for the next day is generally not zero. On the other hand, due to regression to the mean, forecasts that follow days with abnormally high volumes of sales are typically overpredictions, and the plotted circles corresponding to naïve-one-day-ahead consequently all lie above the ideal line for predictions larger than one. Simple28 days 1116 does not exhibit the same level of balance as LightGBM 1112, but is less biased than naïve-one-day-ahead 1114.

The stratified noise plot in benchmark chart 1102b exhibits a clear separation of the four models. Benchmark model 1110 fits the Poisson-ideal perfect line, while for every prediction bucket, LightGBM 1112 exhibits a slightly higher level of noise. Simple28 days 1116 is slightly worse, populating the area corresponding to "OK" 1026 performance. Naïve-one-day-ahead 1114 has a poor performance compared to the other models, with the majority of the plotted circles on the boundary of "Insufficient" 1030 performance, as the regression-to-the-mean effect is especially strongly pronounced for the largest predictions, which correspond to the largest observations on the day before. Although RMRPS often handles slow mover predictions well, it does not adequately show differentiation among models in the ultra-slow-regime where all the lines converge, which may require consideration of bias and noise. The rating of each forecast model is shown in TABLE 3.

TABLE 3

| Model | $S_{overall}$ (RMRPS) | Quality (RMRPS) | $S_{overall}$ (Bias) | Quality (Bias) | Bias Factor |
|---|---|---|---|---|---|
| Benchmark | 99.9% | Perfect | 98.2% | Perfect | 0.9937 |
| LightGBM | 66.4% | Good | 87.6% | Excellent | 0.9904 |
| Simple28days | 57.4% | OK | 53.1% | OK | 0.9626 |
| Naïve-one-day-ahead | 41.0% | Fair | 36.9% | Fair | 1.0001 |

FIGS. 12A-12D illustrate forecast rating graphs 1202a-1202d for three forecast models 1112-1116 and benchmark model 1110, in accordance with an embodiment. Forecast rating graphs 1202a-1202d compare the scaling-aware ratings of benchmark model 1110, LightGBM 1112, naïve-one-day-ahead 1114, and simple28 days 1116 for the MAE metric in forecast rating graph 1202a, the RMAE metric in forecast rating graph 1202b, the MRPS metric in forecast rating graph 1202c, and the RMRPS metric in forecast rating graph 1202d. Accordingly, Y-axis 1204 of forecast rating graph 1202a corresponds to the MAE score, Y-axis 1206 of forecast rating graph 1202b corresponds to the RMAE score, Y-axis 1208 of forecast rating graph 1202c corresponds to the MRPS score, and Y-axis 1210 of forecast rating graph 1202d corresponds to the RMRPS score. Each of forecast rating graphs 1202a-1202d show achieved value 1220 and ranges for scores that are "Perfect" 1222, "Excellent" 1224, "Good" 1226, "OK" 1228, "Fair" 1230, "Insufficient" 1232, and "Bad" 1234.

Forecast rating graphs 1202a-1202d show a set of prediction-stratified buckets indexed by R, where each bucket contains an average prediction $$r_{mean}^{(R)},$$

a total prediction $$r_{total}^{(R)},$$

an average observation $$s_{mean}^{(R)},$$

a total observation $$s_{total}^{(R)},$$

achieved metrics $M^{(R)} = \vec{r}^{(R)}, \vec{s}^{(R)}$, and scaling-aware ratings. However, according to embodiments, bucket and rating aggregation module 212 of forecast rating system 110 may condense the information contained in forecast rating graphs 1202a-1202d by summarizing the results into a single number.

According to some embodiments, bucket and rating aggregation module 212 aggregates the ratings per bucket of the metric. Each bucket may be defined by the rounded logarithm of the rate R (see Equation 1). For each bucket, bucket and rating aggregation module 212 computes the achieved metric value ($M^{(R)} = \vec{r}^{(R)}, \vec{s}^{(R)}$) and the reference values of the metric for the different ratings $$\left( M_{perfect}^{(R)}, M_{excellent}^{(R)}, M_{good}^{(R)}, M_{OK}^{(R)}, M_{fair}^{(R)}, M_{insufficient}^{(R)}, M_{bad}^{(R)} \right),$$

as well as the total prediction and the total observation $$\left( r_{total}^{(R)} = \sum\nolimits_{j, R_j = R} r_j \right)$$

and the total observation $$\left( s_{total}^{(R)} = \sum\nolimits_{j, R_j = R} s_j \right).$$

The metric M is a loss function, such that larger values are considered worse, and $$M_{actual}^{(R)} > M_{bad}^{(R)}$$

corresponds to a significant problem of the forecast in the respective bucket.

Using the example of forecasting graphs 1202a-1202d, to adapt the weighted sum to scores for which larger values imply better performance such that the ratings correspond to an overall score $S_{overall}$, bucket and rating aggregation module 212 maps quality categories ("Perfect" 1222, "Excellent" 1224, "Good" 1226, "OK" 1228, "Fair" 1230, "Insufficient" 1232, and "Bad" 1234) to percentage ratings $S_{quality}$ using a scale between 100% (best) to 0% (worst), as shown in TABLE 4:

For each bucket, the achieved metric $$M_{actual}^{(R)}$$

is compared to an $$M_{upper}^{(R)} \text{ and } M_{lower}^{(R)}$$

that define the two neighboring qualities, with percentage ratings $S_{upper}$ and $S_{lower}$, respectively. For the bias, bucket and rating aggregation module 212 maps negative bias values of $$r_{total}^{(R)} / s_{total}^{(R)} = b < 1 \text{ to } 1/b > 1$$

to achieve a monotonic behavior of the rating (for example, a bias of 1.1 is rated as being equivalent to a bias of approximately 0:91).

Bucket and rating aggregation module 212 sets the percentage rating of the bucket to the linear interpolation of the ratings achieved by the neighboring buckets as shown in Equation 10:

$$S^R = S_{lower} + (S_{upper} - S_{lower}) \frac{M_{actual}^R - M_{lower}^R}{M_{upper}^R - M_{lower}^R} \qquad (10)$$

Bucket and rating aggregation module 212 calculates the overall rating as weighted mean of the $S^{(R)}$, as shown in Equation 11:

$$S_{overall} = \frac{\sum_R S^R \cdot \max\left( s_{total}^R, r_{total}^R \right)}{\sum_R \max\left( s_{total}^R, r_{total}^R \right)} \qquad (11)$$

where each bucket is weighted by the larger of the total sales or the total observation that belong to the bucket R. Weighting by total bucket sales or by total bucket predictions avoids neglecting extreme over- or under-forecasting. That is, bucket and rating aggregation module 212 accounts for buckets with $$0 \approx s_{total}^{(R)} \ll r_{total}^{(R)}$$

TABLE 4

| Quality | Perfect | Excellent | Good | OK | Fair | Insufficient | Unacceptable |
|---|---|---|---|---|---|---|---|
| $S_{quality}$ | >91.67% | >75% | >58.33% | >41.67% | >25% | >0.083% | <0.083% | as well as buckets with $$s_{total}^{(R)} \gg r_{total}^{(R)} \approx 0$$

with a substantial weight. The resulting $S_{overall}$ is the scaling-aware rating of the overall set of predictions and observations.

According to other embodiments, bucket and rating aggregation module 212 rates the overall aggregated metric via reference values. Bucket and rating aggregation module 212 may put the overall metric $M(\vec{r}, \vec{s})$ into context by computing reference values $M_{perfect}(\vec{r})$, $M_{excellent}(\vec{r})$, $M_{good}(\vec{r})$, $M_{OK}(\vec{r})$, $M_{fair}(\vec{r})$, $M_{insufficient}(\vec{r})$, and $M_{bad}(\vec{r})$ by computing the overall metric $M_{quality}(\vec{r})$, that would have been achieved had all buckets R achieved $$M_{actual}^{(R)}(\vec{r})$$

for a given set of buckets. Visually speaking, bucket and rating aggregation module 212 moves all the buckets to a location on a forecast rating graph and/or a benchmark chart at which bucket and rating aggregation module 212 would have rated the buckets with a particular quality and computes the overall metric for that hypothetical case. This provides corroboration for statements such as "an RMAE of 44% was achieved overall, which is between good (38%) and OK (46%)".

The rating of the overall aggregated metric and the weighted mean rating of the buckets often yield similar conclusions. However, each answers a different question and may also deviate substantially. For example, a forecast that is unbiased overall, as described by Equation 12:

$$\sum_R r_{total}^R \approx \sum_R s_{total}^R \qquad (12)$$

The overall aggregated bias is, thus, excellent. However, it may still be the case that slow movers are heavily under-forecasted while fast movers are over-forecasted (or vice versa), such as in Equation 13:

$$\forall R : r_{total}^R \neq \sum_R s_{total}^R \qquad (13)$$

The scaling-aware rating then yields a critical value (such as, for example, "fair," "insufficient," etc.), while the overall aggregated metric receives a benevolent value (such as, for example, "good," "excellent," etc.).

With benchmark charts 1102a-1102b of FIGS. 11A-11B and forecast rating graphs 1202a-1202d of FIGS. 12A-12D, one may build up the confidence that LightGBM 1112 is consistently better than simple28 days 1116, across all prediction buckets and in a stable fashion. For example, the improvement in the slow movers does not come at the expense of fast movers, or vice versa. The rating of bias per bucket is more stringent than the overall bias alone. For example, naïve-one-day-ahead 1114 is, by construction, overall unbiased (it uses the sales of the last day before and the first twenty-seven days of the validation period where, due to the pronounced week-day effect, the twenty-eighth day is similar to the last day before the period), but only the bucket with R≈1 is unbiased, resulting in only "Fair" 1230 performance.

Figure 13A:
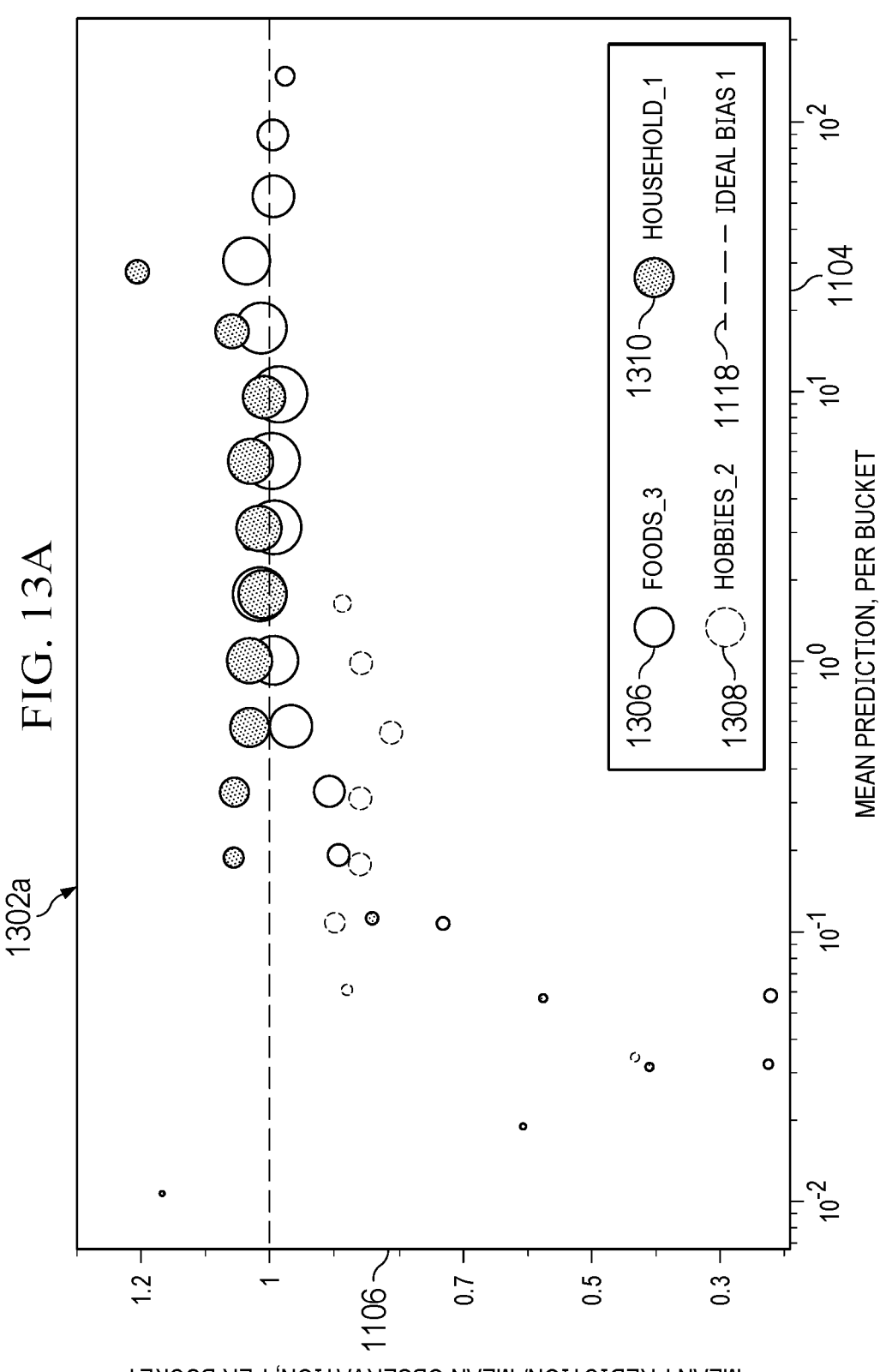
FIGS. 13A-13B illustrate benchmark charts for three different product categories, in accordance with an embodiment.
Figure 13B:
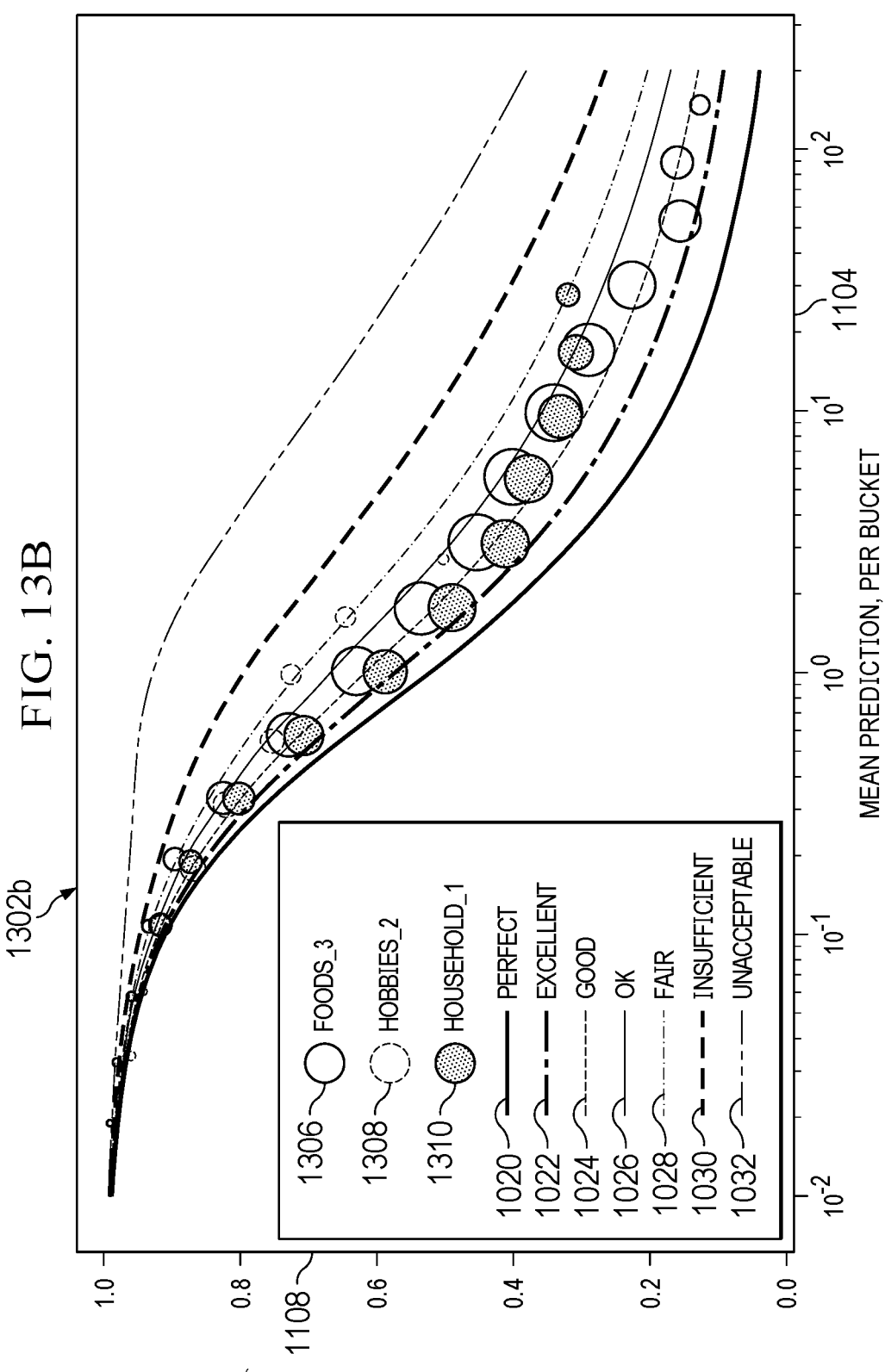
Figure 14A:
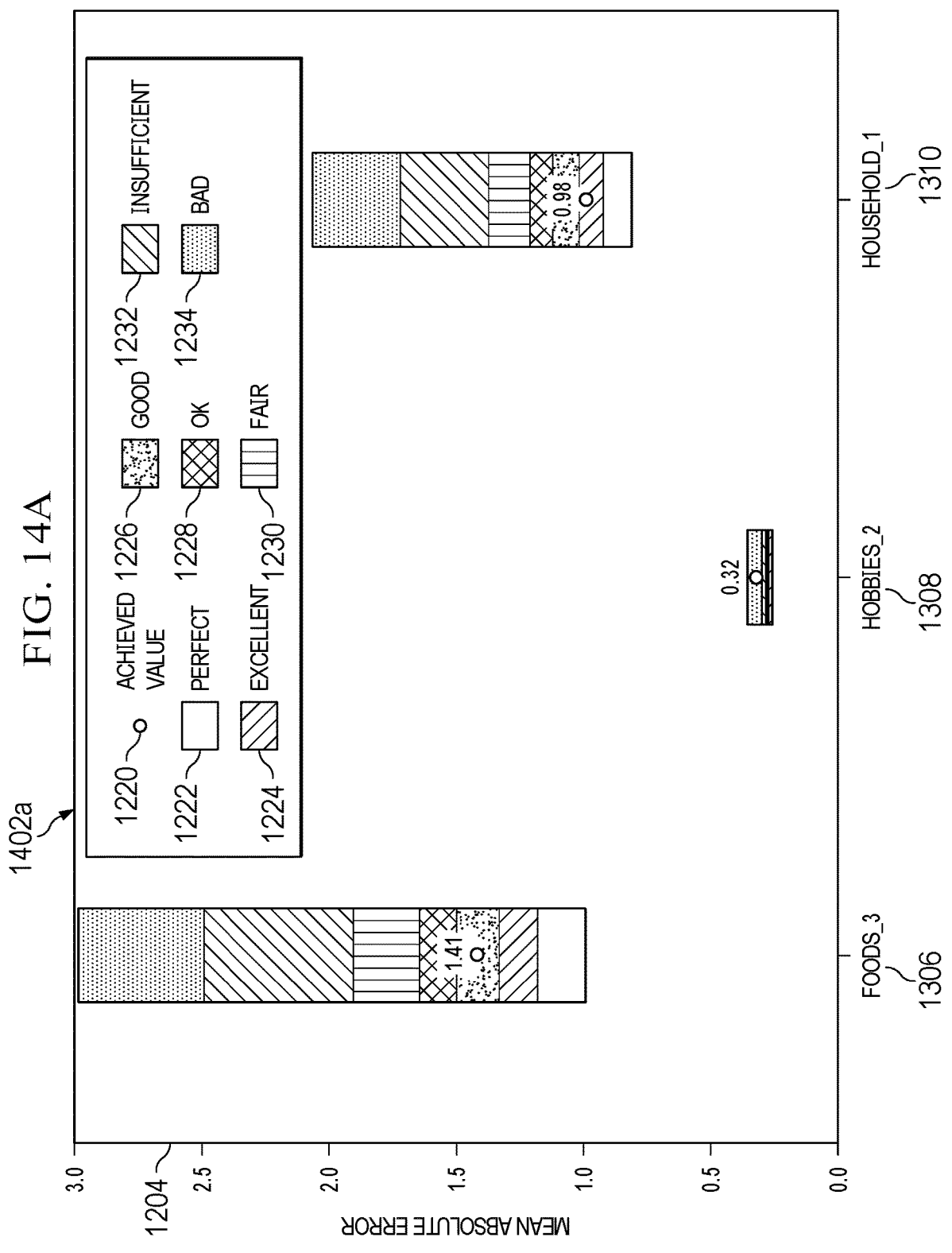
FIGS. 14A-14D illustrate forecast rating graphs for three product categories, in accordance with an embodiment.
Figure 14B:
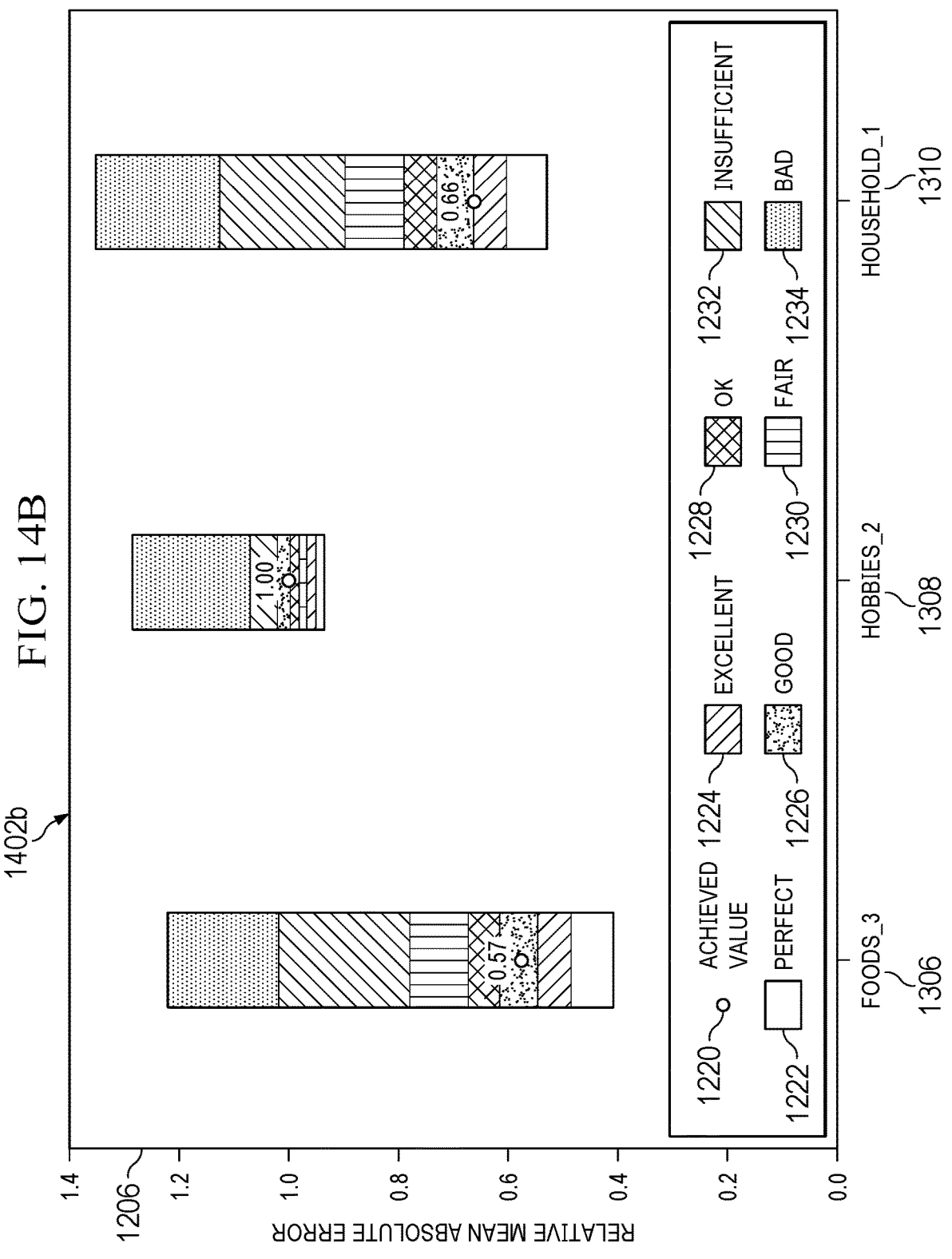
Figure 14C:
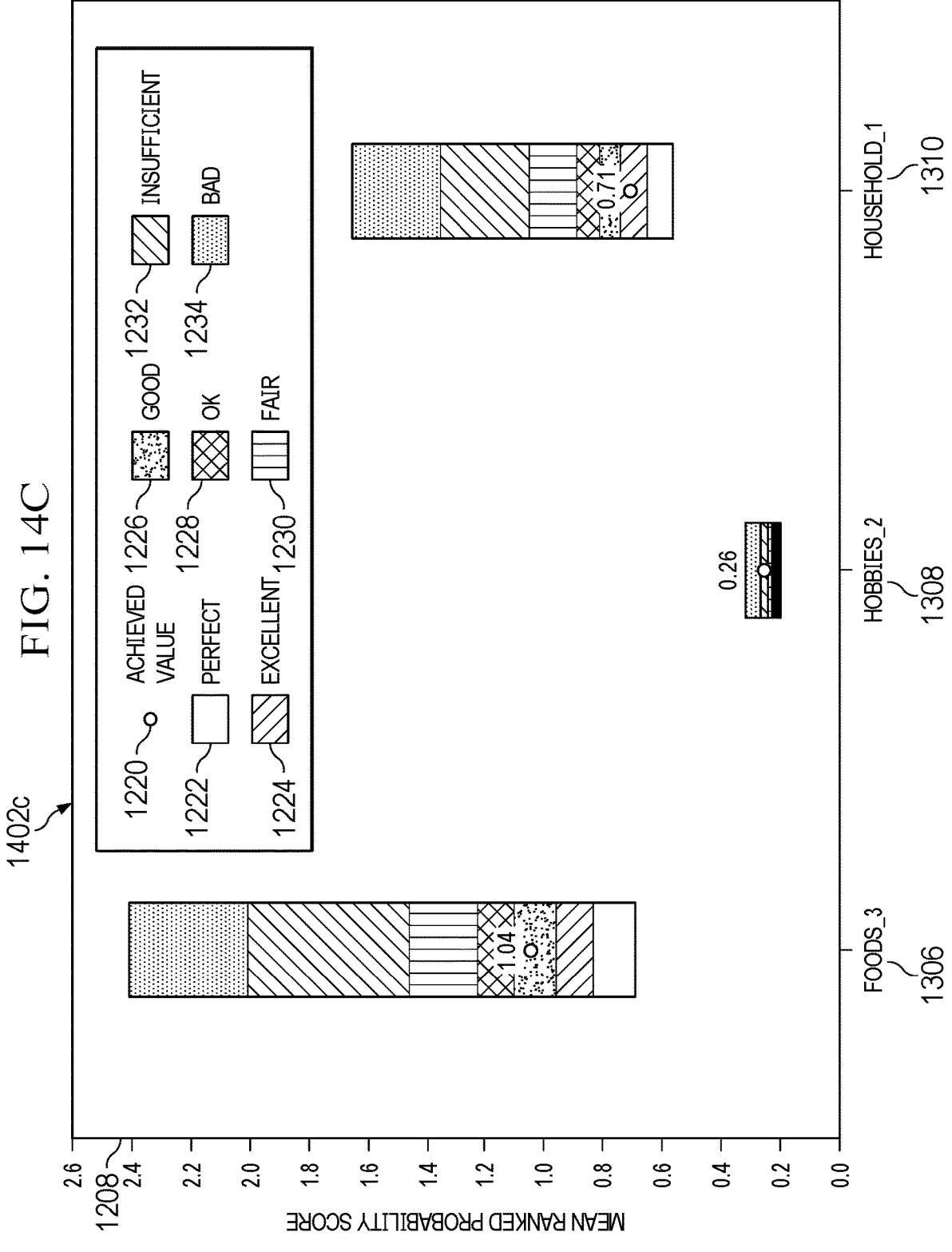
Figure 14D:
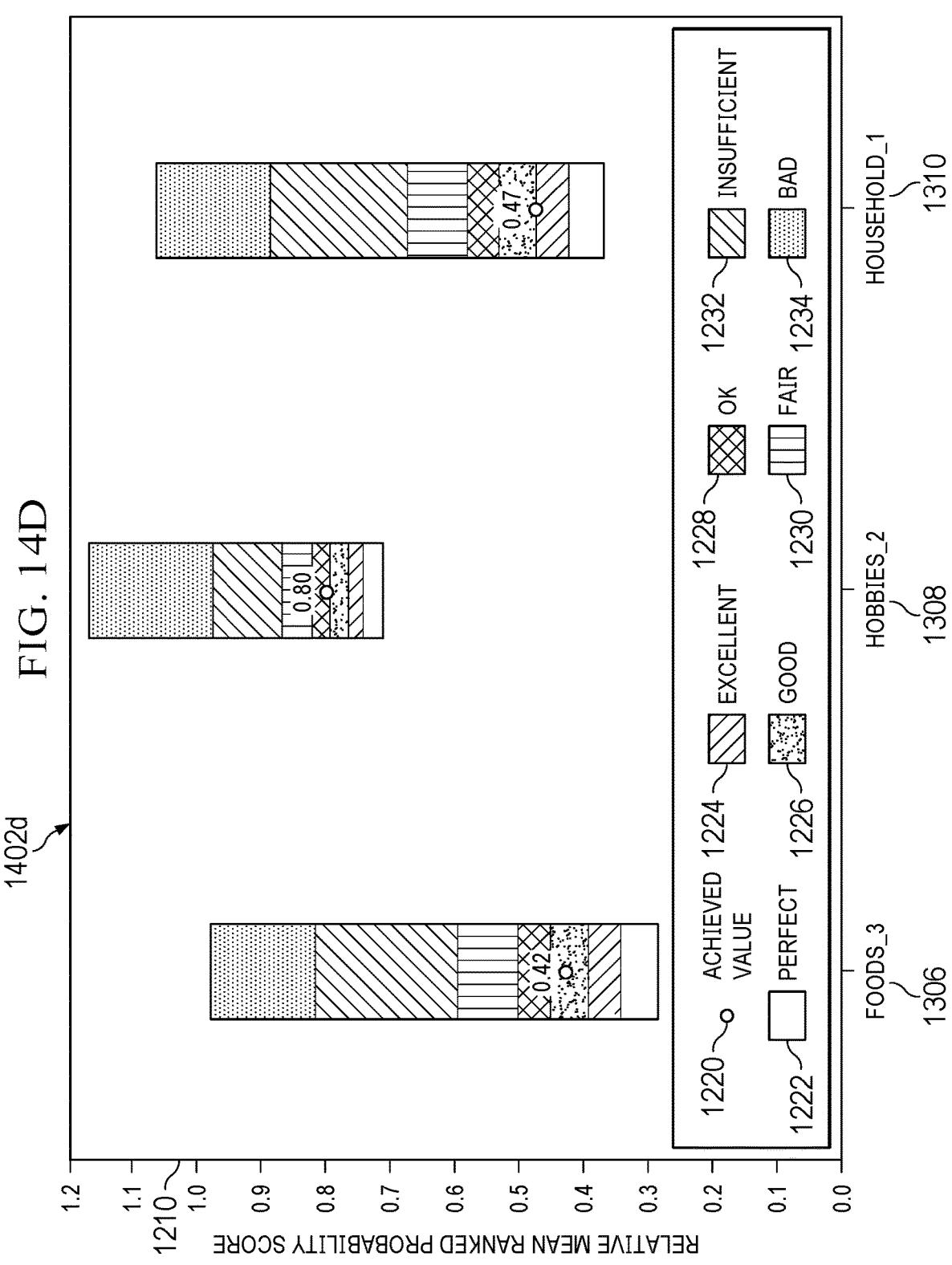

FIGS. 13A-13B illustrate benchmark charts 1302a-1302b for three product categories 1306-1310, in accordance with an embodiment. The forecast model used in benchmark charts 1302a-1302b is LightGBM 1112. Benchmark charts 1302a-1302b compare the product categories of FOODS_3 1306, HOBBIES_2 1308, and HOUSEHOLD_1 1310. Benchmark chart 1302a plots product categories 1306-1310 against ideal bias 1118, and benchmark chart 1302b plots product categories 1306-1310 against a rating scale. X-axis 1104 of benchmark charts 1302a-1302b corresponds to the mean prediction per bucket. Y-axis 1106 of benchmark chart 1302a corresponds to the bias factor per bucket, and Y-axis 1108 of benchmark chart 1302b corresponds to the RMRPS score per bucket. Like benchmark charts 1102a-1102b, benchmark chart 1302b shows boundary lines for buckets that are considered "Perfect" 1020, "Excellent" 1022, "Good" 1024, "OK" 1026, "Fair" 1028, "Insufficient" 1030, and "Unacceptable" 1032. The rating of each product category is shown in TABLE 5.

TABLE 5

| | FOODS_3 | HOUSEHOLD_1 | HOBBIES_2 |
|---|---|---|---|
| Number of Predictions | 230,440 | 148,960 | 41,720 |
| Total Sales | 564,926 | 222,327 | 13,302 |
| Total Prediction | 564,939 | 227,855 | 11,377 |
| Bias Factor | 1.0 | 1.0249 | 0.8553 |
| $S_{overall}$ (Bias) | 91.3% | 83.7% | 46.3% |
| MAE | 1.406149 | 0.983042 | 0.317785 |
| MRPS | 1.039640 | 0.707278 | 0.255006 |
| $S_{overall}$ (MRPS) | 64.9% | 80.0% | 14.1% |
| RMAE | 0.573585 | 0.658642 | 0.996692 |
| RMRPS | 0.424081 | 0.473879 | 0.799793 |
| $S_{overall}$ (RMRPS) | 66.0% | 75.6% | 63.5% |
| MAPE | 0.393694 | 0.346950 | .0187718 |
| CDF Accuracy | 0.918794 | 0.943558 | 0.980229 |

FIGS. 14A-14D illustrate forecast rating graphs 1402a-1402d for three product categories 1306-1310, in accordance with an embodiment. Like benchmark charts 1302a-1302b of FIGS. 13A-13B, the forecast model used in forecast rating graphs 1402a-1402d is LightGBM 1112. Forecast rating graphs 1402a-1402d compare the scaling-aware ratings for the product categories of FOODS_3 1306, hobbies_2 1308, and HOUSEHOLD_1 1310 for the MAE metric in forecast rating graph 1402a, the RMAE metric in forecast rating graph 1402b, the MRPS metric in forecast rating graph 1402c, and the RMRPS metric in forecast rating graph 1402d. Accordingly, Y-axis 1204 of forecast rating graph 1402a corresponds to the MAE score, Y-axis 1206 of forecast rating graph 1402b corresponds to the RMAE score, Y-axis 1208 of forecast rating graph 1402c corresponds to the MRPS score, and Y-axis 1210 of forecast rating graph 1402d corresponds to the RMRPS score. Each of forecast rating graphs 1402a-1402d show achieved value 1220 and ranges for scores that are "Perfect" 1222, "Excellent" 1224, "Good" 1226, "OK" 1228, "Fair" 1230, "Insufficient" 1232, and "Bad" 1234.

Benchmark chart 1302b shows that the forecast model for HOUSEHOLD_1 1310 has slightly less noise than the forecast model for FOODS_3 1306, and both these departments perform much better than the forecast model for HOBBIES_2 1308. FOODS_3 1306 has no overall bias (1.0) and a high bias rating (91.3%), as shown in TABLE 5.

The largest predictions in HOUSEHOLD_1 1310 are deteriorated with respect to both bias and noise, indicating poor performance. On the other hand, in FOODS_3 1306, only the small predictions stand out as being under-forecasted.

Due to the systematic bias in HOBBIES_2 1308, which is also reflected by the bias score (46.3%), the scaling-aware rating of MRPS gives a critical rating of 14.1%, while RMRPS is more benevolent (63.5%), as a systematic bias shifts the noise value to a higher or lower benchmark. The CDF accuracy heavily suffers from scaling. For example, although HOBBIES_2 1308 is biased, it reaches the highest value of the CDF accuracy among the departments, because this metric is more benevolent to slow movers than to fast movers.

Scaling-aware forecast rating provides a framework to tackle the problem of scaling in a systematic and reproducible way. The universal aspects (such as, for example, the scaling of the Poisson distribution and the scaling of the noise of forecast quality references) may be modelled in an industry-independent fashion, which allows to directly compare data subsets for one model. For example, forecast rating system 110 may provide results to make hybrid comparisons, such as, for example, comparing a grocery retailer using a time-series model and a soft lines retailer using a machine learning model. While such hybrid comparisons are often inaccurate when using standard forecast metrics, scaling-aware ratings provide more meaningful comparisons. Forecast rating system 110 provides a way to judge the status quo of a given forecast and determines whether certain desired improvements in accuracy are realistic or not.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for evaluating a forecast, comprising:
   aggregating, by a computer comprising a processor and memory, a set of predictions and a set of actuals into one or more prediction buckets, wherein the aggregating separates high volume and low volume products and accounts for a shelf-life of perishable goods;
   rating, by the computer, prediction data of the set of predictions using one or more forecast metrics;
   computing, by the computer, an ideal benchmark for the one or more forecast metrics;
   determining, by the computer, a scaling adjustment to calculate one or more non-ideal benchmarks to create a forecast rating scale;
   determining, by the computer, a score for each of the one or more prediction buckets, the score corresponding to the forecast rating scale;
   aggregating, by the computer, the determined one or more scores of the one or more prediction buckets to generate an overall score; and
   improving, by the computer, a probability density function by iteratively applying an update rule, wherein a probability density that contributes to observations that are underpredicted is boosted.

2. The computer-implemented method of claim 1, wherein the one or more prediction buckets are logarithmically spaced.

3. The computer-implemented method of claim 1, further comprising:
   determining, by the computer, the scaling adjustment by simulating non-Poissonian dispersions.

4. The computer-implemented method of claim 1, wherein the one or more forecast metrics comprise one or more functions that produce a numerical rating that compares one or more prediction values with one or more actual values.

5. The computer-implemented method of claim 1, further comprising:
   associating, by the computer, a percentage scale with the forecast rating scale.

6. The computer-implemented method of claim 1, further comprising:
   depicting, by the computer, the overall score as a forecast rating graph.

7. The computer-implemented method of claim 1, further comprising:
   generating, by the computer, a calibration diagram comprising observed frequency and predicted probability of the set of predictions and the set of actuals.

8. A system for evaluating a forecast, comprising:
   a computer, comprising a processor and memory, the computer configured to:
   aggregate a set of predictions and a set of actuals into one or more prediction buckets, wherein the aggregating separates high volume and low volume products and accounts for a shelf-life of perishable goods;
   rate prediction data of the set of predictions using one or more forecast metrics;
   compute an ideal benchmark for the one or more forecast metrics;
   determine a scaling adjustment to calculate one or more non-ideal benchmarks to create a forecast rating scale;
   determine a score for each of the one or more prediction buckets, the score corresponding to the forecast rating scale;
   aggregate the determined one or more scores of the one or more prediction buckets to generate an overall score; and
   improve a probability density function by iteratively applying an update rule, wherein a probability density that contributes to observations that are underpredicted is boosted.

9. The system of claim 8, wherein the one or more prediction buckets are logarithmically spaced.

10. The system of claim 8, wherein the computer is further configured to:
    determine the scaling adjustment by simulating non-Poissonian dispersions.

11. The system of claim 8, wherein the one or more forecast metrics comprise one or more functions that produce a numerical rating that compares one or more prediction values with one or more actual values.

12. The system of claim 8, wherein the computer is further configured to:
    associate a percentage scale with the forecast rating scale.

13. The system of claim 8, wherein the computer is further configured to:
    depict the overall score as a forecast rating graph.

14. The system of claim 8, wherein the computer is further configured to:

generate a calibration diagram comprising observed frequency and predicted probability of the set of predictions and the set of actuals.

15. A non-transitory computer-readable medium embodied with software for evaluating a forecast, the software when executed:

aggregates a set of predictions and a set of actuals into one or more prediction buckets, wherein the aggregating separates high volume and low volume products and accounts for a shelf-life of perishable goods;

rates prediction data of the set of predictions using one or more forecast metrics;

computes an ideal benchmark for the one or more forecast metrics;

determines a scaling adjustment to calculate one or more non-ideal benchmarks to create a forecast rating scale;

determines a score for each of the one or more prediction buckets, the score corresponding to the forecast rating scale;

aggregates the determined one or more scores of the one or more prediction buckets to generate an overall score; and improves a probability density function by iteratively applying an update rule, wherein a probability density that contributes to observations that are underpredicted is boosted.

16. The non-transitory computer-readable medium of claim 15, wherein the one or more prediction buckets are logarithmically spaced.

17. The non-transitory computer-readable medium of claim 15, wherein the software when executed further:

determines the scaling adjustment by simulating non-Poissonian dispersions.

18. The non-transitory computer-readable medium of claim 15, wherein the one or more forecast metrics comprise one or more functions that produce a numerical rating that compares one or more prediction values with one or more actual values.

19. The non-transitory computer-readable medium of claim 15, wherein the software when executed further:

associates a percentage scale with the forecast rating scale.

20. The non-transitory computer-readable medium of claim 15, wherein the software when executed further:

depicts the overall score as a forecast rating graph.

\* \* \* \* \*